(12) United States Patent
Zhou

(10) Patent No.: US 11,304,191 B2
(45) Date of Patent: Apr. 12, 2022

(54) METHOD AND APPARATUS FOR TRANSMITTING INFORMATION TO AVOID IN-DEVICE INTERFERENCE

(71) Applicant: Beijing Xiaomi Mobile Software Co., Ltd., Beijing (CN)

(72) Inventor: Juejia Zhou, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 80 days.

(21) Appl. No.: 16/715,784

(22) Filed: Dec. 16, 2019

(65) Prior Publication Data

US 2020/0120678 A1 Apr. 16, 2020

Related U.S. Application Data

(63) Continuation of application No. PCT/CN2017/093506, filed on Jul. 19, 2017.

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/001* (2013.01); *H04W 8/22* (2013.01);
(Continued)

(58) Field of Classification Search
CPC . H04W 72/0453; H04W 8/22; H04W 72/042; H04W 72/082; H04W 72/1226; H04L 5/001
See application file for complete search history.

(56) References Cited

U.S. PATENT DOCUMENTS 9,060,280 B2 6/2015 Koo et al.
9,179,350 B2 * 11/2015 Yao ................. H04W 72/082
(Continued)

FOREIGN PATENT DOCUMENTS

CN 102378192 A 3/2012
CN 102378195 A 3/2012
(Continued)

OTHER PUBLICATIONS

Notification to Grant Patent for Invention of Chinese Application No. 201780000654.6 dated Dec. 4, 2019.
(Continued)

*Primary Examiner* — Jael M Ulysse
(74) *Attorney, Agent, or Firm* — Finnegan, Henderson, Farabow, Garrett & Dunner, L.L.P.

(57) ABSTRACT

A method for transmitting information includes: determining a target frequency range involved in an in-device interference in user equipment when the in-device interference is likely to occur, the target frequency range including a target downlink frequency range and at least one target uplink frequency range; adjusting a transmission resource configuration within the target frequency range; and transmitting information over a transmission resource after adjustment of the transmission resource configuration within the target frequency range, to avoid occurrence of the in-device interference.

25 Claims, 13 Drawing Sheets

(51) Int. Cl.
H04W 8/22 (2009.01)
H04W 72/08 (2009.01)
H04W 72/12 (2009.01)
(52) U.S. Cl.
CPC ....... *H04W 72/042* (2013.01); *H04W 72/082* (2013.01); *H04W 72/1226* (2013.01)

(56) References Cited

U.S. PATENT DOCUMENTS

| | | | | |
|---|---|---|---|---|
| 2001/0016499 | A1* | 8/2001 | Hamabe | H04B 17/354 455/454 |
| 2010/0074209 | A1* | 3/2010 | Montojo | H04L 5/0066 370/329 |
| 2012/0082101 | A1* | 4/2012 | Gaal | H04W 72/1226 370/329 |
| 2012/0087341 | A1* | 4/2012 | Jang | H04W 72/1215 370/331 |
| 2012/0207040 | A1 | 8/2012 | Comsa et al. | |
| 2013/0114515 | A1 | 5/2013 | Koo et al. | |
| 2013/0322260 | A1* | 12/2013 | Yao | H04L 1/00 370/241 |
| 2013/0337815 | A1* | 12/2013 | Sebire | H04W 36/20 455/438 |
| 2015/0109932 | A1* | 4/2015 | Goldhamer | H04L 47/125 370/236 |
| 2015/0245365 | A1* | 8/2015 | Isokangas | H04L 5/0096 455/423 |
| 2015/0334620 | A1 | 11/2015 | Fu et al. | |
| 2015/0382362 | A1* | 12/2015 | Park | H04W 72/082 370/330 |

FOREIGN PATENT DOCUMENTS

| | | |
|---|---|---|
| CN | 102378369 A | 3/2012 |
| CN | 102469465 A | 5/2012 |
| CN | 102546074 A | 7/2012 |
| CN | 102595465 A | 7/2012 |
| CN | 103155448 A | 6/2013 |
| CN | 107466486 A | 12/2017 |
| CN | 107466487 A | 12/2017 |
| EP | 2 737 766 B1 | 4/2015 |
| JP | 2013-535938 A | 9/2013 |
| JP | 2013546236 A | 12/2013 |
| JP | 2014502825 A | 2/2014 |
| JP | 2020509710 A | 3/2020 |
| WO | WO 2017/082780 A1 | 5/2017 |

OTHER PUBLICATIONS

Acceptance Decision of Russian Application No. 2020102303 dated Jul. 29, 2020.
3GPP TR 36.816 V11.2.0 (Dec. 2011), Study on signalling and procedure for interference avoidance for in-device coexistence, Dec. 2011, pp. 1-44.
First Office Action of Chinese application No. 201780000654.6, dated Mar. 18, 2019.
Second Office Action of Chinese application No. 201780000654.6 dated Jun. 14, 2019.
Third Office Action of Chinese application No. 201780000654.6, dated Sep. 23, 2019.
International Search Report of PCT application No. PCT/CN2017/093506 dated Mar. 27, 2018.
Extended European search report of counterpart EP application No. 17918615.0 dated Dec. 16, 2020.
Mediatek, Trigger of UE Reporting for FDM Solution; 3GPP TSG-RAN WG2 Meeting #72bis, R2-110258, Dublin, Ireland, Jan. 17-21, 2010, 4 pages.
Research in Motion UK Limited, Capability indication from the eNB and UE, 3GPP TSG-RAN WG2 Meeting #78, R2-122728, Prague, Czech, May 21-25, 2012, 3 pages.
3rd Generation Partnership Project; Technical Specification Group Radio Access Networks; Evolved Universal Terrestrial Radio Access (E-UTRA); Study on signalling and procedure for interference avoidance for in-device coexistence; (Release 10), 3GPP TR 36.816 v1.1.1 (Mar. 2011), Mar. 5, 2011, 39 pages.
Ericsson, Extension of IDC-feature for WLAN/LAA RF-sharing, 3GPP TSG-RAN WG2 Meeting #98, R2-1706080, Hangzhou, China, May 15-19, 2017, 4 pages.
Research in Motion UK Limited, Preferred Frequency and Boundary, 3GPP TSG-RAN WG2 Meeting #75, R2-113880, Athens, Greece, Aug. 22-26, 2011, 5 pages.
Japanese Search Report of counterpart JP Application No. 2020-502330 dated Feb. 26, 2021.
Research in Motion UK Limited, Potential Interference for IDC operation, 3GPP TSG-RAN WG2 Meeting #77b, R2-121286, Jeju, Korea, Mar. 26-30, 2012, 4 pages.
Nokia Corporation, UE capabilities in Release 11, 3GPP TSG-RAN WG2 Meeting #79bis, R2-124581, Bratislava, Slovakia, Oct. 8-12, 2012, 5 pages.
Samsung, IDC in case of carrier aggregation, 3GPP TSG-RAN2#79Bis, R2-124760, Bratislava, Oct. 8-12, 2012, 3 pages.
Notification of Reason for Refusal dated Jun. 29, 2021, from the Korean Intellectual Property Office in counterpart Korean Application No. 10-2020-7004687.
Examination Report dated Jun. 27, 2021, from in counterpart Indian Application No. 202027007113.
ZTE, Further discussion on DRX mechanism for IDC, R2-114949, 3GPP TSG-RAN WG2 Meeting #75bis, Oct. 10-14, 2011, 8 pages.
Notice of Reasons for Refusal dated Nov. 26, 2021, from the Japanese Patent Office issued in counterpart Japanese Application No. 2020-502330.
Notification of Reason for Refusal dated Dec. 27, 2021, from the Korean Intellectual Property Office issued in counterpart Korean Application No. 10-2020-7004687.
Guangdong OPPO Mobile Telecom, "Discussion on the NR-LTE self-interference issue", 3GPP TSG RAN WG1 NR Ad-Hoc#2, R1-1710173, Qingdao, P.R. China, Jun. 27-30, 2017.

* cited by examiner

METHOD AND APPARATUS FOR TRANSMITTING INFORMATION TO AVOID IN-DEVICE INTERFERENCE

CROSS-REFERENCE TO RELATED APPLICATIONS

This application is a continuation of International Application No. PCT/CN2017/093506, filed Jul. 19, 2017, the entire content of which is incorporated herein by reference.

TECHNICAL FIELD

The present disclosure relates to the technical field of communication, and in particular, relates to a method and apparatus for transmitting information.

BACKGROUND

With the development of wireless communication technologies, mobile communication networks are gradually evolving to 5G networks. In the early stage of deployment of the 5G networks, signal coverage is achieved mainly using the 4G long term evolution (LTE) systems. The 5G network, that is, a new radio (NR) system, is a powerful supplement for data transmission services, and forms LTE-NR interworking deployment. In the current stage, the 5G NR is mostly deployed within a frequency range of 3.3 GHz to 4.2 GHz, and the LTE mostly operates within a frequency range of 1.7 GHz to 1.8 GHz, for example, the mainstream frequency division duplexing (FDD) frequency band 3 or the like.

SUMMARY

Embodiments of the present disclosure provide a method and apparatus for transmitting information to reduce occurrence of in-device interference.

According to a first aspect of the embodiments of the present disclosure, a method for transmitting information is provided. The method is applied to a base station, and includes: determining a target frequency range involved in an in-device interference in user equipment when the in-device interference is likely to occur, the target frequency range including a target downlink frequency range and at least one target uplink frequency range; adjusting a transmission resource configuration within the target frequency range; and transmitting information over a transmission resource after adjustment of the transmission resource configuration within the target frequency range, to avoid occurrence of the in-device interference.

According to a second aspect of the embodiments of the present disclosure, a method for transmitting information is provided. The method is applied to user equipment, and includes: receiving uplink transmission configuration information sent by a base station for avoiding in-device interference, the uplink transmission configuration information including an adjustment parameter of an uplink frequency range; transmitting, based on the uplink transmission configuration information, uplink information over an uplink transmission resource scheduled by the base station; and acquiring downlink information from a downlink transmission resource scheduled by the base station.

According to a third aspect of the embodiments of the present disclosure, an apparatus for transmitting information is provided. The apparatus is applied to a base station, and includes: a processor; and a memory storing instructions executable by the processor; wherein the processor is configured to: determine a target frequency range involved in an in-device interference in user equipment when the in-device interference is likely to occur in the user equipment, the target frequency range including a target downlink frequency range and at least one target uplink frequency range; adjust a transmission resource configuration within the target frequency range; and transmit information over a transmission resource after adjustment of the transmission resource configuration within the target frequency range, to avoid occurrence of the in-device interference.

According to a fourth aspect of the embodiments of the present disclosure, an apparatus for transmitting information is provided. The apparatus is applied to user equipment, and includes: a processor; and a memory storing instructions executable by the processor; wherein the processor is configured to: receive uplink transmission configuration information sent by a base station for avoiding in-device interference, the uplink transmission configuration information including an adjustment parameter of an uplink frequency range; transmit, based on the uplink transmission configuration information, uplink information over an uplink transmission resource scheduled by the base station; and acquire downlink information from a downlink transmission resource scheduled by the base station.

It is to be understood that both the foregoing general description and the following detailed description are exemplary and explanatory only and are intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1-2 is a schematic diagram of intermodulation interference according to an exemplary embodiment.

FIG. 2 is a flowchart of a method for transmitting information according to an exemplary embodiment.

FIG. 5-1 is a schematic diagram of an information transmission according to an exemplary embodiment.

FIG. 5-2 is a schematic diagram of an information transmission according to an exemplary embodiment.

FIG. 5-3 is a schematic diagram of an information transmission according to an exemplary embodiment.

FIG. 6-1 is a schematic diagram of an information transmission according to an exemplary embodiment.

FIG. 6-2 is a schematic diagram of an information transmission according to an exemplary embodiment.

FIG. 6-3 is a schematic diagram of an information transmission according to an exemplary embodiment.

FIG. 7-1 is a flowchart of a method for transmitting information according to an exemplary embodiment.

FIG. 7-2 is a flowchart of a method for transmitting information according to an exemplary embodiment.

DETAILED DESCRIPTION

Figure 1:
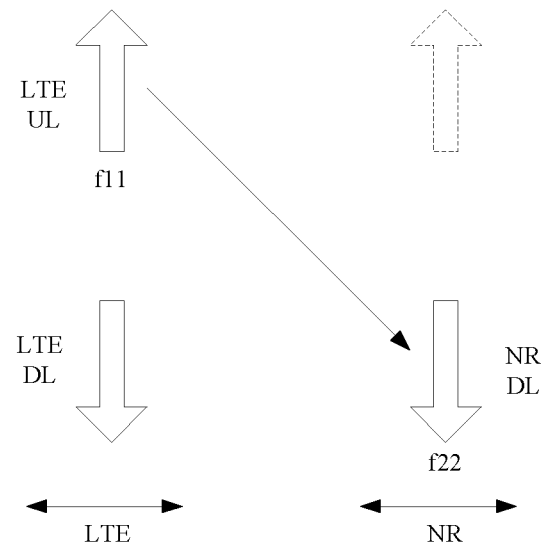
FIG. 1-1 is a schematic diagram of harmonic interference according to an exemplary embodiment.

Exemplary embodiments are described in detail herein, and examples thereof are illustrated in the accompanying drawings. Where the description hereinafter refers to the accompanying drawings, unless otherwise specified, identical reference numerals in the accompanying drawings denote identical or like elements. Implementations described in the following exemplary embodiments do not represent all the implementations consistent with the present disclosure. On the contrary, these implementations are merely examples illustrating apparatuses and methods according to some aspects of the present disclosure, as described in the appended claims.

The methods described below may be performed by a base station, a sub-base station or the like equipped with a large-scale antenna array, collectively referred to herein as a base station. The methods described below may also be performed by a user terminal, a user node, a mobile terminal, a tablet computer or the like, collectively referred to herein as user equipment (UE). In some embodiments, the base station and the UE are independent of each other and are also correlated with each other to collaboratively implement the technical solutions of the present disclosure.

In the embodiments of the present disclosure, the UE may be provided with radio frequency transceiver units in different network modes, for example, an LTE radio frequency transceiver unit in the 4G network, and an NR radio frequency transceiver unit in the 5G network. An operating frequency of the LTE radio frequency transceiver unit is within a network deployment frequency of the 4G network, for example, within the range of 1.7 GHz to 1.8 GHz. The NR radio frequency transceiver unit operates at a frequency within the range of 2.4 GHz to 4.2 GHz or at a higher frequency, for example, a frequency over 6 GHz.

When an LTE radio frequency transceiver unit and an NR radio frequency transceiver unit arranged in the UE operate simultaneously, especially when the LTE radio frequency transceiver unit carries out uplink transmission over an LTE uplink transmission resource, and meanwhile the NR radio frequency transceiver unit receives uplink information over a downlink transmission resource in an NR frequency band, harmonic interference may be apt to occur. For example, when an LTE transmitter unit transmits uplink data by an uplink operating frequency in LTE frequency band 3, the NR radio frequency transceiver unit receives the downlink information. Since in LTE band 3, an available uplink operating frequency range is 1710 MHz-1785 MHz, whose frequency multiplication range is 3420 MHz-3570 MHz which overlaps a portion of frequency bands in a frequency range of 3.3 GHz to 4.2 GHz in an NR frequency band. Accordingly, when an operating frequency range within which the NR radio frequency transceiver unit in the UE receives the downlink information overlaps a frequency multiplication range of an uplink operating frequency range that is currently used by the LTE transmitter unit, the current uplink transmission of the UE may cause interference to reception of the downlink information in the NR frequency band by the UE.

In addition, when the NR radio frequency transceiver unit and/or the LTE radio frequency transceiver unit carry out the uplink transmission over the uplink transmission resources within at least two different frequency ranges, due to the effect of a nonlinear device in a transmitter unit, a combined frequency component is produced. When the combined frequency component has a frequency that is close to a frequency of other useful signals, for example, a frequency at which a receiver unit receives downlink signals, intermodulation interference may be caused to the useful signals, for example, the LTE downlink information.

In-device interference occurring in the UE may include harmonic interference and intermodulation interference. In communications, regardless of which types of in-device interference, receiving and sending of useful information by the UE may be affected, such that communication quality and user experience of the UE in the 5G network are influenced. The harmonic interference may be caused because a frequency multiplication range of an uplink operating frequency range f11 of the LTE overlaps a downlink operating frequency range f22 of the NR, as illustrated in FIG. 1-1, or because a frequency multiplication range of an NR uplink operating frequency range overlaps another NR downlink operating frequency range. That is, the harmonic interference may be caused during LTE-NR interworking, or may be interference caused during NR-NR interworking by the UE.

Figures 1, 2:
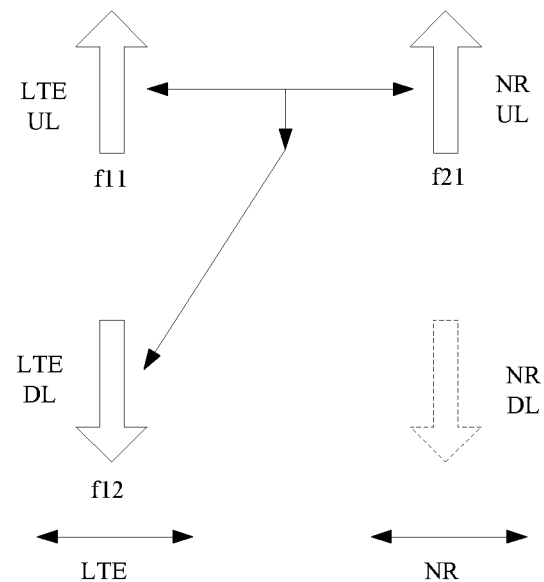
Figure 2:
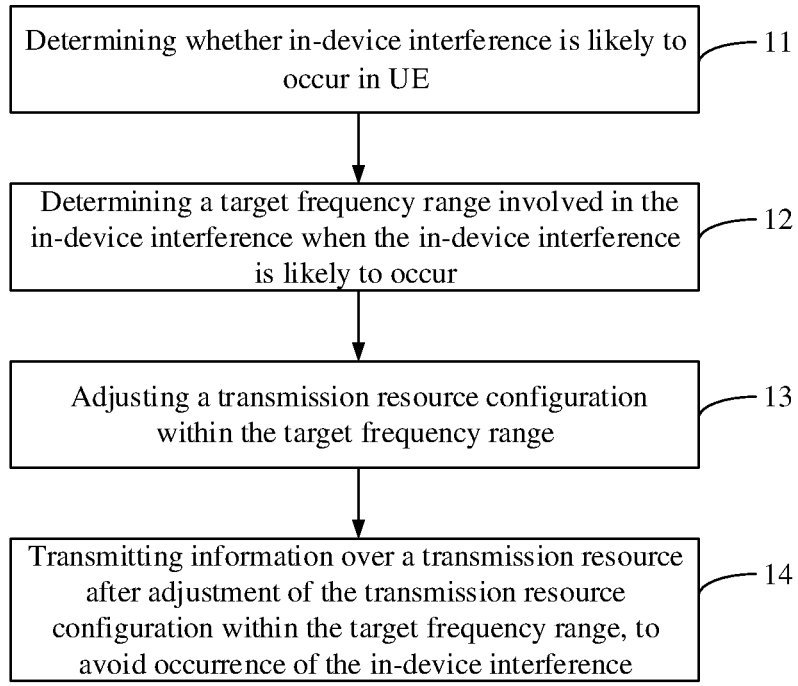

With respect to the intermodulation interference, when a combined frequency range of two or more uplink operating frequency range overlaps a downlink operating frequency range, the intermodulation interference may be caused. Exemplarily, as illustrated in FIG. 1-2, when uplink transmission is carried out within the uplink operating frequency range f11 of the LTE and an uplink operating frequency range f21 simultaneously, a combined frequency range of f11 and f21 may overlap another downlink operating frequency range f12 within which downlink transmission is being carried out, and as a result the intermodulation interference may be caused in the UE. In FIG. 1-2, when f11 and f12 both pertain to the operating frequency range of the LTE radio frequency transceiver unit, the LTE radio frequency transceiver unit operates in an LTE-FDD duplex mode. Likewise, the intermodulation interference may be caused during LTE-NR interworking of the UE, or may be interference caused during NR-NR interworking of the UE.

Based on this, the present disclosure provides a method for transmitting information, to reduce the in-device interference that occurred when the UE simultaneously transmit uplink information within the same time period.

FIG. 2 is a flowchart of a method for transmitting information according to an exemplary embodiment. The method is applied to a base station, and the method may include the following steps:

In step 11, whether in-device interference is likely to occur in UE is determined.

Whether the in-device interference is likely to occur in the UE may be determined at different opportunities, which may include the following two cases.

In a first case, after the UE accesses the network, whether the in-device interference is likely to occur in the UE is determined based on an acquired radio frequency support capability of the UE.

Figure 3:
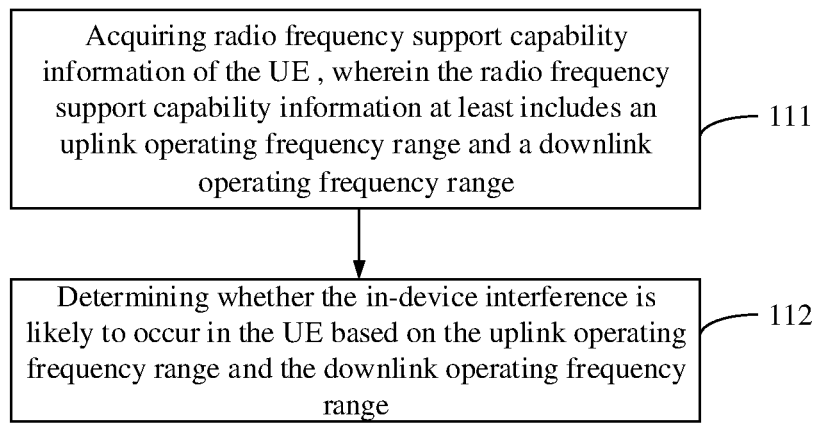
FIG. 3 is a flowchart of a method for transmitting information according to an exemplary embodiment.

FIG. 3 is a flowchart of a method for transmitting information according to an exemplary embodiment. As illustrated in FIG. 3, step 11 may include the following steps.

In step 111, radio frequency support capability information of the UE is acquired, wherein the radio frequency support capability information at least includes an uplink operating frequency range and a downlink operating frequency range.

Based on different operating frequency ranges supported by the UE, at least two uplink operating frequency ranges that may be used for uplink information transmission are determined, and at least two downlink operating frequency ranges that may be used for downlink information reception are determined. Based on different duplex modes of information transmission, an uplink operating frequency range of the UE may be the same as a downlink operating frequency range. As illustrated in FIG. 1-1, the LTE radio frequency transceiver unit operates in an LTE-TDD mode, and an uplink operating frequency range LTE UL and a downlink operating frequency range LTE DL may be the same frequency range.

In step 112: whether the in-device interference is likely to occur in the UE is determined based on the uplink operating frequency range and the downlink operating frequency range.

Based on different types of the in-device interference, step 112 may be performed in different manners.

In a first manner, based on an uplink operating frequency range and a downlink operating frequency range, whether the in-device interference is likely to occur in the UE is determined in accordance with a harmonic interference condition, wherein the harmonic interference condition is: a frequency multiplication range of the uplink operating frequency range may overlap the downlink operating frequency range.

In a second manner, based on at least two uplink operating frequency ranges and a downlink operating frequency range, whether the in-device interference is likely to occur in the UE is determined in accordance with an intermodulation interference condition, wherein the intermodulation interference condition is: a combined operating frequency range of the at least two uplink operating frequency ranges overlaps the downlink operating frequency range.

Exemplarily, as illustrated in FIG. 1-1 and FIG. 1-2, assuming that the UE supports four operating frequency ranges including: LTE uplink and downlink operating frequency ranges, that is, LTE UL and LTE DL; NR uplink and downlink operating frequency ranges, that is, NR UL and NR DL. Assuming that the LTE radio frequency transceiver unit employs an FDD mode, and uplink and downlink operating bandwidths thereof are both 20 M; the NR radio frequency transceiver unit employs time division duplex (TDD) mode, and uplink and downlink operating bandwidths thereof are both 60 M, the operating frequency ranges may be as listed in Table 1:

TABLE 1

| Network segment | Frequency identifier | Bandwidth range (MHz) |
| --- | --- | --- |
| LTE UL | f11 | 1710-1730 |
| LTE DL | f12 | 1920-1940 |
| NR UL | f21 | 3420-3480 |
| NR DL | f22 | 3420-3480 |

As listed in Table 1, when the LTE uplink and the NR downlink operate at the same time, since the frequency multiplication of f11 overlaps the frequency range 3420 to 3460 MHz of f22, that is, (1710-1730)×2=3240-3460 MHz, the harmonic interference may occur in the UE, as illustrated in FIG. 1-1.

Likewise, when the LTE uplink, the NR uplink and the LTE downlink operate at the same time, due to an effect of a non-linear device, a combined frequency of f11 and f21 partially overlaps f12, and as a result, the intermodulation interference may occur in the UE, as illustrated in FIG. 1-2.

In the embodiment of the present disclosure, the base station may judge in advance, based on the acquired radio frequency support capability of the UE, that is, the uplink operating frequency range and the downlink operating frequency range of the UE, whether the in-device interference may occur during simultaneous uplink and downlink transmissions by the UE. In this way, preparations may be made in advance for adjust a scheduling policy, and a schedule policy for preventing occurrence of the in-device interference may be formulated in advance.

In a second case, whether the in-device interference is likely occur in the UE may be determined in real time based on an uplink scheduling request and downlink schedule information of the UE.

Figure 4:
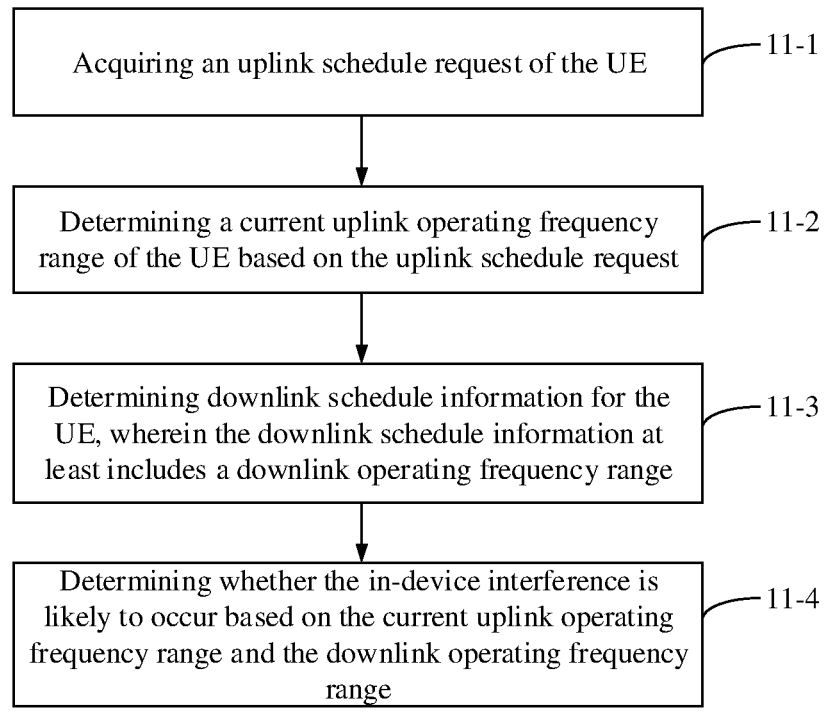
FIG. 4 is a flowchart of a method for transmitting information according to an exemplary embodiment.

FIG. 4 is a flowchart of a method for transmitting information according to an exemplary embodiment. As illustrated in FIG. 4, step 11 may include the following steps:

In step 11-1, an uplink scheduling request of the UE is acquired.

The uplink scheduling request sent by the UE is to request the base station to allocate an uplink transmission resource to the UE.

In the present disclosure, the transmission resource may be a physical resource block (PRB) and a modulation and coding scheme (MSC). In a frequency domain, the PRB may be a carrier of a fixed bandwidth.

In step 11-2, a current uplink operating frequency range of the UE is determined based on the uplink scheduling request.

After the UE accesses the network, the base station may acquire the radio frequency support capability of the UE, including: an uplink operating frequency range supported by the UE. After the UE sends the uplink scheduling request to the base station, the base station may determine, based on pre-configured radio frequency support capability information of the UE, an uplink operating frequency range corresponding to the uplink scheduling request. As illustrated in the above example, when the UE requests the base station to allocate an uplink transmission resource of the 4G network, the base station queries Table 1 and determines that the uplink operating frequency range corresponding to the current request is f11: 1710 MHz-1730 MHz.

In step 11-3, downlink schedule information for the UE is determined, wherein the downlink schedule information at least includes a downlink operating frequency range.

The base station determines downlink schedule information for the UE, wherein the downlink schedule information at least includes: a downlink operating frequency range.

In step 11-4, whether the in-device interference is likely to occur is determined based on the current uplink operating frequency range and the downlink operating frequency range.

Likewise, in step 11-4, whether the in-device interference is likely to occur in the UE may be determined by the two fashions in step 11-2.

After the base station determines that the in-device interference is likely to occur in the UE, when frequency-domain resources are scheduled still in a conventional scheduling fashion, the in-device interference may occur in the UE, and thus preparations are made to adjust the frequency range of the uplink and downlink scheduling to prevent occurrence of the in-device interference.

In the embodiment of the present disclosure, the base station may determine in real time, based on the uplink scheduling request of the UE, whether the in-device interference is likely to occur, such that the resource schedule policy may be adjusted at a previous moment, for example, a previous transmission time interval (TTI) before occurrence of the interference. In this way, occurrence of the in-device interference is prevented in real time, and efficiency of information transmission is improved.

In another embodiment of the present disclosure, to prevent the scenario where adjustment of the base station is non-effective due to an interference avoidance capability of the UE, the base station may further determine whether predefined interference avoidance settings are configured in the UE prior to adjusting the uplink and downlink schedule policies. The predefined interference avoidance settings are configured to prevent occurrence of the in-device interference by operations of the UE. The predefined interference avoidance settings may be: when the in-device interference occurs, triggering a predefined operation such that information transmission is stopped within at least one target operating frequency range involved in the in-device interference.

In the UE, the predefined interference avoidance settings may be defined by a pre-configured user operation interface. For example, the user operation interface may be a switch control for controlling a network communication module within an operating frequency range, for example, an LTE SIM card or an NR SIM card. When the in-device interference occurs, the user may operate the switch control to disable the communication module involved in the in-device interference. In another embodiment of the present disclosure, the predefined interference avoidance settings may also be settings that are automatically triggered when the UE detects that the in-device interference occurs.

In one embodiment of the present disclosure, the base station may acquire an avoidance setting detection report from the UE, wherein the avoidance setting detection report is configured to report whether the predefined interference avoidance settings are configured in the UE. When the report indicates that the predefined interference avoidance settings are configured in the UE, the base station may determine that the in-device interference may not occur, and thus there is no need to prevent the in-device interference by adjusting the frequency-domain resource scheduling when the interference is to occur, which prevents the increase of calculation load and signaling overhead due to the adjustment of the frequency-domain resource scheduling.

When the report indicates that no predefined interference avoidance settings are configured in the UE, the base station may determine that the in-device interference may occur, and thus the base station needs to prevent the in-device interference by adjusting the frequency-domain resource scheduling before the interference is to occur.

In the embodiment of the present disclosure, prior to performing resource scheduling for preventing the in-device interference, the base station may further firstly determine whether settings for preventing the in-device interference are configured in the UE, and effectively prevent occurrence of the in-device interface by modifying the frequency-domain resource schedule policy. In this way, a scenario where scheduling adjustment by the base station fails due to the interference avoidance capability of the UE is prevented.

Referring back to FIG. 2, in step 12, when the in-device interference is likely to occur, a target frequency range involved in the in-device interference is determined, wherein the target frequency range includes a target downlink frequency range and at least one target uplink frequency range.

As illustrated in the above example, based on different implementations of step 11, the base station may determine the target uplink frequency range and the target downlink frequency range involved in the in-device interference. With respect to the first case in step 11, when the in-device interference that is to occur is first harmonic interference, a target uplink operating frequency range and a target downlink operating frequency range are involved; and when the in-device interference that is to occur is first intermodulation interference, at least two target uplink operating frequency ranges and a target downlink operating frequency range are involved.

With respect to the second case in step 11, the target downlink frequency range is determined based on the downlink frequency range which the base station plans to schedule, wherein the downlink frequency range which the base station plans to schedule may be less than a downlink operating bandwidth supported by the UE. For example, with respect to the case as illustrated in FIG. 1-1, the downlink frequency-domain resource which the base station plans to schedule is within a frequency range of 3430 MHz to 3450 MHz. In this case, the target downlink frequency range determined by the base station is 3430 MHz-3450 MHz, and the target uplink frequency range is 1715 MHz-1725 MHz.

That is, the target uplink frequency range determined by the base station pertains to a portion of the uplink operating frequency range supported by the UE: 1710 MHz-1730 MHz.

In step 13, a transmission resource configuration within the target frequency range is adjusted.

In the embodiment of the present disclosure, the in-device interference may be prevented by adjusting the frequency range of the uplink and downlink scheduling, that is, the target frequency range.

In the present disclosure, based on priorities of uplink and downlink services to be transmitted, the base station may adjust a resource configuration within the target uplink frequency range, that is, an uplink frequency-domain resource configuration, and/or adjust a resource configuration within the target downlink frequency range, that is, a downlink frequency-domain resource configuration, to reduce or prevent the in-device interference and reasonably prevent occurrence of the in-device interference.

With respect to the adjustment of the target downlink frequency range, the base station may adjust the downlink frequency-domain resource configuration in the following manners.

In a first manner, a transmission resource configuration within the target downlink frequency range is canceled, and downlink information that is originally to be transmitted within the target downlink frequency range is delayed for transmission.

Figures 1, 5:
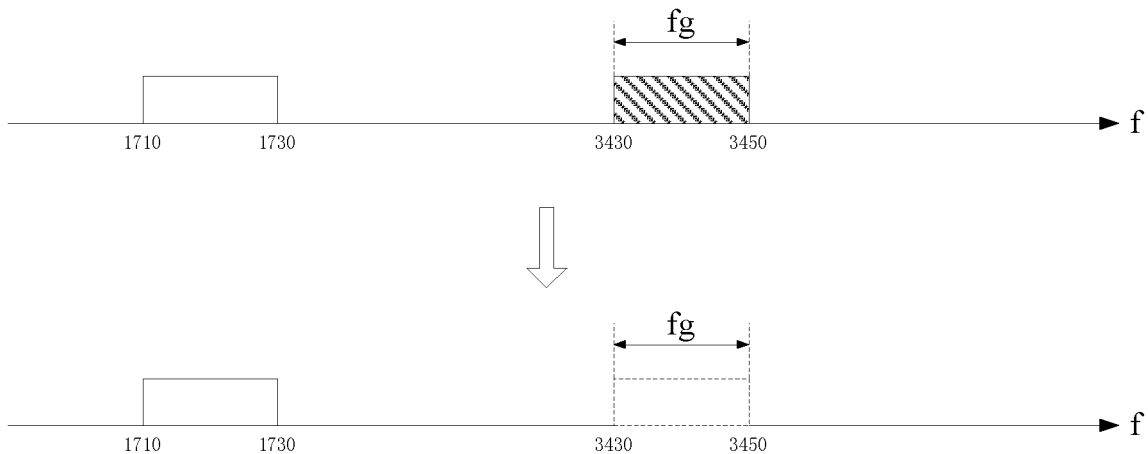
Figures 2, 5:
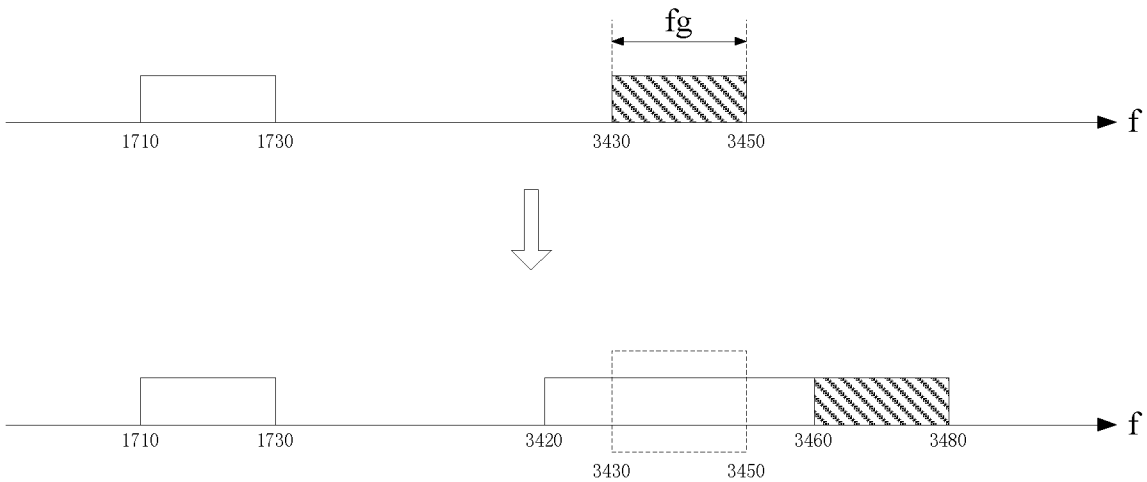
Figures 3, 5:
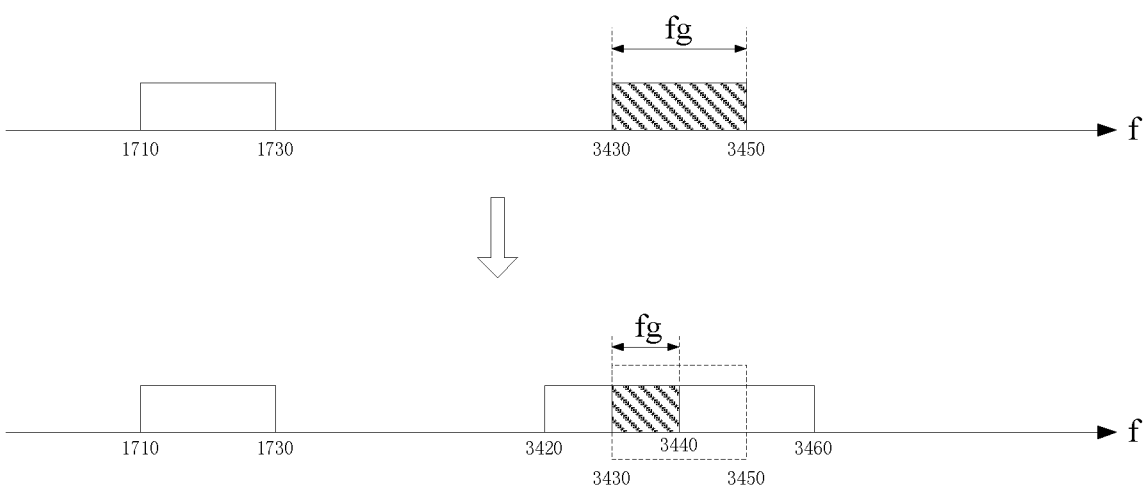

Assuming that the base station plans to allocate, within a TTI, an uplink transmission resource within an uplink frequency range of 1710 MHz to 1730 MHz to the UE, and allocate, within the same TTI, a downlink transmission resource within a frequency range of 3430 MHz to 3450 MHz, then a target downlink frequency range fg involved in the in-device interference is 3430 MHz-3450 MHz, as illustrated in FIG. 5-1. In this case, the base station may cancel the originally planned downlink frequency-domain resource configuration while scheduling the uplink frequency-domain resource for the UE.

The embodiment of the present disclosure is applicable to a scenario where the priority of the uplink data to be transmitted by the UE is higher than that of the downlink information. The base station may not temporarily configure a frequency-domain resource for transmitting the downlink information within the target downlink frequency range, but preferentially configure an uplink frequency-domain resource which the UE requests the base station to schedule. In this way, the UE may preferentially transmit the uplink information, such that an interference signal generated within the target uplink frequency range is prevented.

In a second manner, based on the first fashion, the downlink frequency-domain resource that is to be originally scheduled is transferred to another frequency range.

It is still assumed that the LTE uplink operating frequency range of the UE is 1710 MHz-1730 MHz, and the NR downlink operating frequency range of the UE is 3420 MHz-3480 MHz. As illustrated in FIG. 5-2, the base station may transfer a 20M downlink transmission resource that is to be originally allocated within a frequency range of 3430 MHz to 3450 MHz to a frequency range of 3460 MHz to 3480 MHz. By such scheduling, uplink transmission of the UE is not affected, and meanwhile the downlink information that is to be originally transmitted may be transmitted to the UE.

Nevertheless, when an available downlink frequency range is less than 20M on the premise of ensuring the uplink scheduling, a transmission amount of the downlink information within the TTI may be reduced. For example, assuming that the UE supports an NR downlink operating frequency range of 3420 MHz to 3470 MHz, then the UE may allocate the downlink transmission resource within a frequency range of 3460 MHz to 3470 MHz, to prevent occurrence of the in-device interference.

In this manner, when available bandwidth still remains within the downlink operating frequency range supported by the UE after the downlink bandwidth that may be subject to interference within the target uplink frequency range is removed, the base station may transfer the frequency resource that is to be originally within the target downlink frequency range to the remaining available bandwidth. When the UE carries out transmissions over the allocated frequency-domain resource, the interference caused by the uplink transmission to the downlink transmission is reduced as much as possible.

In a third manner, the downlink frequency range is narrowed.

Still using the scenario where the LTE uplink operating frequency range of the UE is 1710 MHz-1730 MHz as an example, it is assumed that the NR downlink operating frequency range of the UE is 3420 MHz-3460 MHz. The downlink frequency-domain resource which the base station plans to schedule is within a frequency range of 3430 MHz to 3450 MHz. In this case, when the uplink transmission of the UE needs to be ensured, and the in-device interference needs to be reduced, the base station may narrow the downlink frequency range that is to be originally scheduled. For example, the downlink frequency range of 3430 MHz to 3450 MHz that is to be originally scheduled is narrowed to 3430 MHz-3440 MHz, that is, the bandwidth is narrowed from 20M to 10M, as illustrated in FIG. 5-3. Under such circumstance, the downlink information subject to the interference is information borne over the downlink transmission resource within the frequency range of 3430 MHz to 3440 MHz. Relative to the previously planed downlink scheduling, the interference is reduced, and transmissions of the downlink information are correspondingly reduced.

In this manner, when the downlink operating frequency range supported by the UE is subject to the interference, and no available bandwidth remains, the base station may reduce the frequency-domain resource that is to be originally allocated within the target downlink frequency range, such that the interference caused by the uplink transmission to the downlink transmission is reduced as much as possible when the UE carries out transmissions over the allocated frequency-domain resource.

In the embodiment of the present disclosure, when the base station adjusts the downlink frequency-domain resource allocation, occurrence of the in-device interference may be effectively prevented by canceling, transferring or narrowing the downlink transmission resource configuration within the target downlink frequency range.

It should be herein noted that the adjusted downlink transmission resource may be a resource that is to be originally allocated to the target downlink frequency range and used for transmitting new downlink information prior to the adjustment, or may be a downlink transmission resource that is to be originally allocated to the target downlink frequency range and used for retransmitting the downlink information.

Therefore, in the present disclosure, the scheduling-adjusted frequency range not only involves a newly scheduled frequency range, but also includes a frequency range for information retransmission. In this way, uninterrupted retransmissions due to failures of retransmissions due to the in-device interference when the information to be retransmitted within the target frequency range is retransmitted may be prevented, and wireless transmission resources of the system may be saved.

With respect to the adjustment of the target uplink frequency range, in the present disclosure, when the uplink scheduling requested in the uplink scheduling request of the UE occupies an over-broad frequency band, and thus the entire downlink operating frequency bands of the UE are subject to the interference or the downlink services of the UE in the base station are too heavy, the base station may prevent occurrence of the in-device interference by adjusting the uplink frequency-domain resource configuration. With respect to the former application scenario, for example, the uplink frequency range which the UE requests the base station to schedule is 1710 MHz-1740 MHz, and the operating frequency range supported by the UE is 3420 MHz-3480 MHz, it is known that when the base station allocates the uplink transmission resource to the UE within the frequency range of 1710 MHz to 1740 MHz based on the uplink scheduling request, the downlink transmission within the entire downlink operating frequency range of the UE may be subject to interference. In the latter application scenario, when the downlink services of the UE at current is heavy, more downlink bandwidth resources are needed for information transmission.

Firstly, an uplink scheduling process in the related art is described as follows: After the base station receives the uplink scheduling request from the UE, an uplink scheduler in the base station may give a schedule result based on the uplink scheduling request of the UE and uplink channel status, for example, an uplink channel quality indicator (CQI) directly measured by the base station. The schedule result includes: uplink frequency-domain resource information.

The uplink frequency-domain resource information may include: a frequency range to be scheduled, for example, a start frequency point and an end frequency point or a start frequency point and bandwidth information; or a serial number of a component carrier (CC) to be scheduled; or a frequency range and/or a quantity of 5G network resources, for example, bandwidth parts (BWPs).

With respect to the above application scenario, the base station may adjust the uplink frequency-domain resource configuration in the following manners to prevent the in-device interference:

In a first manner, the uplink scheduling request is not responded to, and downlink scheduling is performed according to the original plan.

Figures 1, 6:
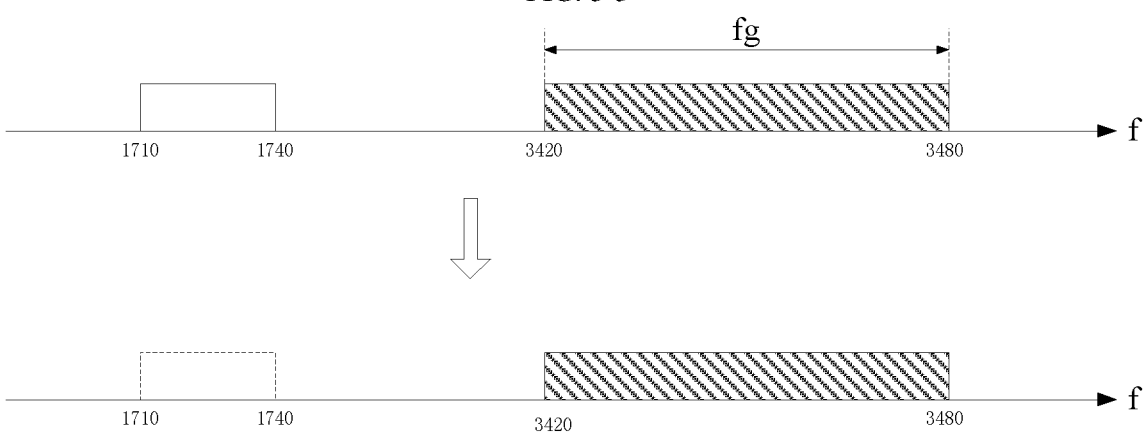
Figures 2, 6:
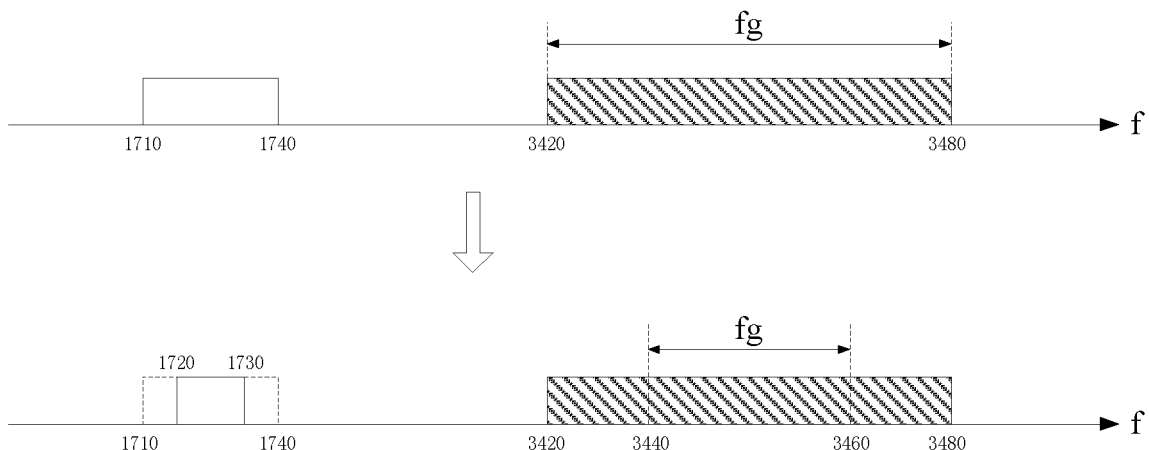
Figures 3, 6:
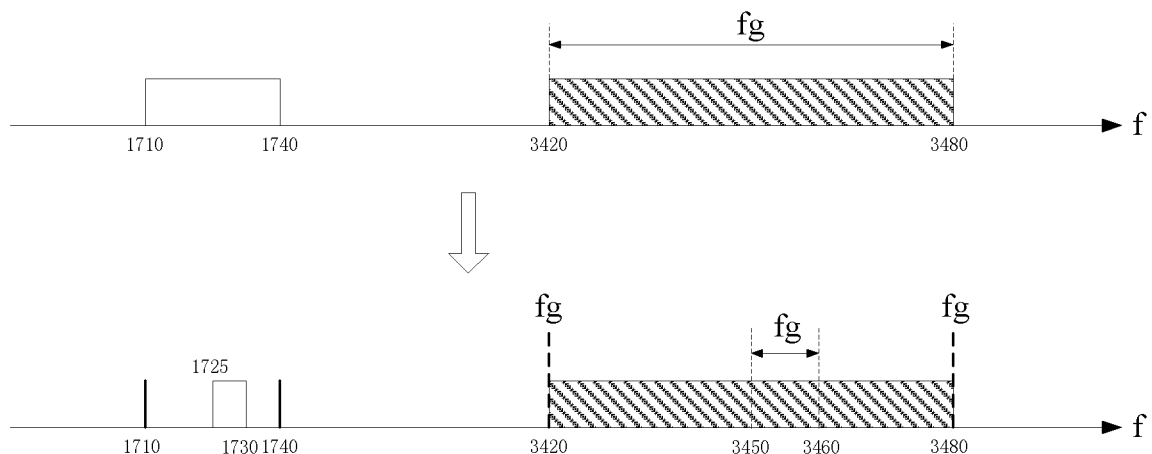

Assuming that the uplink frequency range requested by the UE from the base station is 1710 MHz-1740 MHz, and the operating frequency range supported by the UE is 3420 MHz-3480 MHz, then after the base station acquires the uplink scheduling request from the UE, the base stations temporarily makes no response to the request, that is, rejecting configuring the uplink transmission resource within the target uplink operating frequency range, but preferentially scheduling the downlink transmission resource for the downlink transmission, as illustrated in FIG. 6-1.

When the downlink information to be transmitted has a higher priority, the base station may temporarily make no response to the uplink scheduling request of the UE, but preferentially allocate the downlink frequency-domain resource within the target downlink frequent range involved in the in-device interference, such that it is ensured that the base station may successfully transmit the downlink information to the UE.

In the embodiment of the present disclosure, when the base station prevents the in-device interference by adjusting the uplink frequency-domain resource allocation, the base station may prevent the interference by canceling the uplink frequency-domain resource scheduling, to ensure effective transmission of the downlink information.

In a second manner, the uplink scheduling request is responded, and the frequency range of the uplink scheduling is narrowed.

Considering whether a physical uplink control channel (PUCCH) resource is affected, in the present disclosure, the uplink frequency-domain resources may be reduced in the following manners.

In a first manner, the uplink frequency range is narrowed, and the uplink transmission configuration information is notified to the UE, such that the UE sets the PUCCH resource at a new frequency point, and thus reports a downlink CQI.

Figures 1, 7:
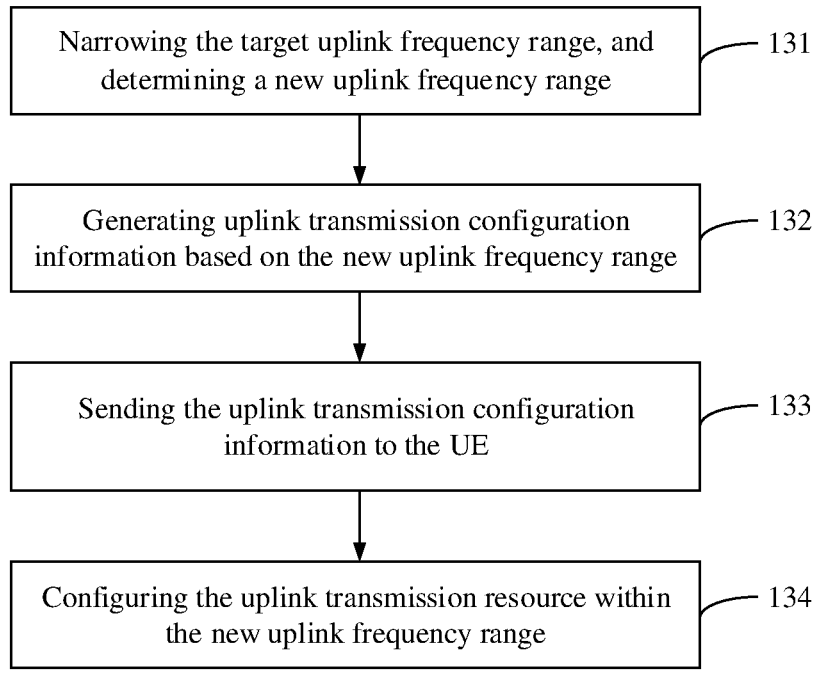
Figures 2, 7:
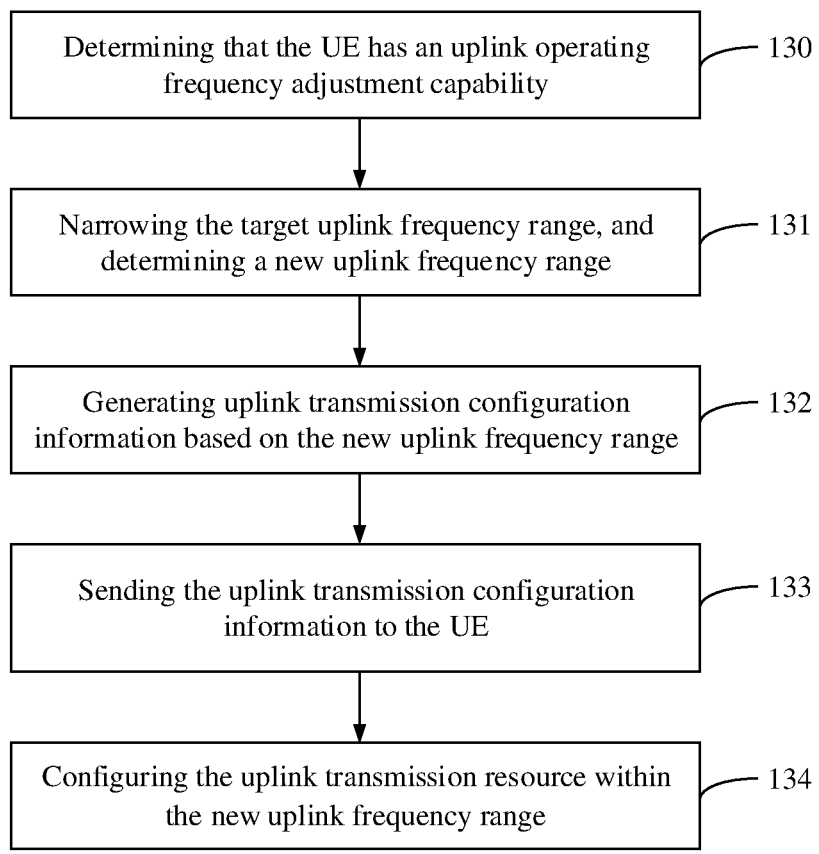

FIG. 7 is a flowchart of a method for transmitting information according to an exemplary embodiment. As illustrated in FIG. 7-1, step 13 may include the following steps.

In step 131, the target uplink frequency range is narrowed, and a new uplink frequency range is determined.

As illustrated in FIG. 6-2, assuming that the UE requests the base station to configure the uplink transmission resource within the frequency range of 1710 MHz to 1740 MHz, then in this case, the base station determines that the downlink scheduling needs to be performed for the UE within the frequency range of 3420 MHz to 3480 MHz, and sends the downlink service data to the UE.

For reduction of the harmonic interference caused by the uplink transmission to the downlink transmission in the UE, in the embodiment of the present disclosure, when the base station schedules the uplink frequency-domain resource for the UE, the frequency range for bearing the uplink transmission resource may be narrowed, as illustrated in FIG. 6-2, wherein the narrowed uplink frequency range may be 1720 MHz-1730 MHz.

In step 132, uplink transmission configuration information is generated based on the new uplink frequency range, wherein the uplink transmission configuration information includes start frequency information and end frequency information of the new uplink frequency range.

According to specifications of the LTE protocols, a PUCCH is arranged at either of two terminals of the uplink frequency operating frequency range. The UE sends uplink control information (UCI) over the PUCCH, wherein the UCI includes: a downlink CQI indicative of downlink channel quality for the reference for the downlink scheduling of the base station, and hybrid automatic repeat request (HARQ) information indicative of whether to retransmit the downlink data or not. Therefore, the base station needs to notify the UE start frequency information and end frequency information of a new uplink frequency range, such that the UE sends the UCI to the base station over a PUCCH configured at a correct frequency point, for example, reporting the downlink CQI information.

Based on this, after the base station adjusts the uplink frequency range, assuming that a configured uplink frequency range is 1720 MHz-1730 MHz, then the base station needs to notify start frequency point information and end frequency point information of the frequency range to the UE as the uplink transmission configuration information, such that the UE periodically reports the CQI over the PUCCHs at the frequency points 1720 MHz and 1730 MHz.

In another embodiment of the present disclosure, when the above modified frequency range is exhibited as one or a plurality of carriers, the base station may notify a carrier serial number of a start position and a carrier serial number of an end position to the UE as the uplink transmission configuration information, such that the UE determines the start frequency point and the end frequency point of the PUCCHs.

In step 133, the uplink transmission configuration information is sent to the UE.

In the embodiment of the present disclosure, the base station may load the uplink transmission configuration information to a broadcast signaling, an RRC signaling on an upper layer or a physical downlink control channel (PDCCH) signaling on a physical layer, and delivers the signaling to the UE.

In step 134, the uplink transmission resource is configured within the new uplink frequency range.

As illustrated in the above example, the base station may configure the uplink transmission resource within a narrower uplink frequency range of 1720 MHz to 1730 MHz, such that the UE transmits the uplink control information and the uplink service data over the uplink frequency-domain resource allocated to the UE.

In the embodiment of the present disclosure, when the base station prevents the in-device interference by adjusting the uplink frequency-domain resource allocation, the base station may narrow the target uplink frequency range, and allocate frequency-domain information within a smaller frequency range, to reduce the interference caused to the downlink transmission. In this fashion, since modification made by the UE via the PUCCH resource, related information of the narrowed frequency range needs to be sent to the UE, such that the UE transmits the uplink control information at a correct frequency point, to ensure correct transmission of the uplink and downlink information.

FIG. 7-2 is a flowchart of a method for transmitting information according to an exemplary embodiment. As illustrated in FIG. 7-2, prior to step 131, the method may further include the following step.

In step 130, it is determined that the UE has an uplink operating frequency adjustment capability.

Based on a device identifier, a device type and the like device information of the UE, it is firstly determined that the UE supports an uplink operating frequency adjustment function, and supports transmission of the uplink information, such as the uplink control information, within a designated uplink frequency range.

In the embodiment of the present disclosure, prior to adjusting the frequency-domain resource allocation within the target uplink and downlink frequency ranges, the base station firstly determines, by adjustment capability information of the UE, whether the UE supports the uplink operating frequency adjustment function, such that it is ensured that the schedule policy adjusted by the base station may be effectively practiced by the UE. In this way, occurrence of the in-device interference may be effectively prevented.

In a second manner, PUCCH transmission is not affected, and the uplink frequency range for transmitting the uplink data is narrowed.

Figure 8:
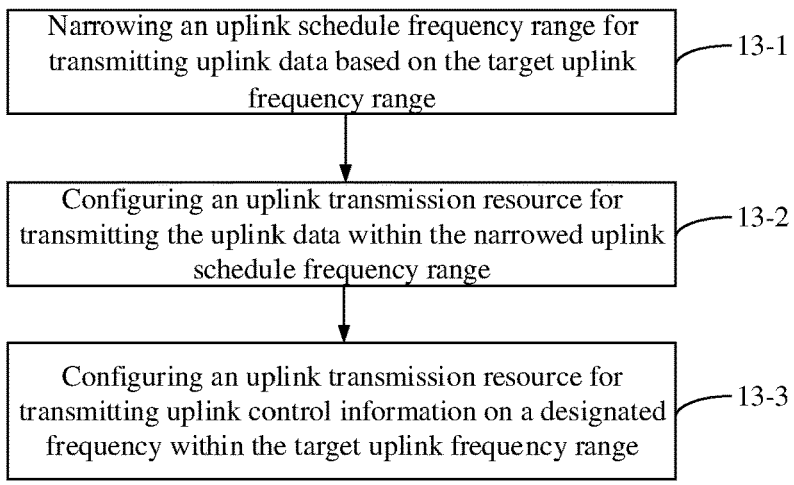
FIG. 8 is a flowchart of a method for transmitting information according to an exemplary embodiment.

FIG. 8 is a flowchart of a method for transmitting information according to an exemplary embodiment. As illustrated in FIG. 8, step 13 may include the following steps.

In step 13-1, an uplink schedule frequency range for transmitting uplink data is narrowed based on the target uplink frequency range.

Still using the scenario where the target uplink operating frequency range is 1710 MHz-1740 MHz as an example, in the embodiment of the present disclosure, the frequency point position where the UE sends the uplink control information over the PUCCH may not be modified, but the uplink schedule frequency range for transmitting the uplink data may be narrowed. For example, a frequency range of 1711 MHz to 1739 MHz is narrowed to a frequency range of 1725 MHz to 1730 MHz.

In step 13-2, an uplink transmission resource for transmitting the uplink data is configured within the narrowed uplink schedule frequency range.

As illustrated in FIG. 6-3, the base station may allocate the frequency-domain resource for transmitting the uplink data within the narrowed uplink schedule frequency range of 1725 MHz to 1730 MHz.

The uplink data to be sent by the UE includes: new uplink data to be sent by the UE and uplink data which the base station requests the UE to retransmit.

In step 13-3, an uplink transmission resource for transmitting uplink control information is configured on a designated frequency within the target uplink frequency range.

As illustrated in FIG. 6-3, physical resources for transmitting the PUCCHs are continuously allocated to the UE at the frequency points 1710 MHz and 1740 MHz based on the uplink scheduling request.

As seen from FIG. 6-3, the adjusted uplink schedule frequency range only causes interference to the downlink transmission within a downlink frequency range of 3450 MHz to 3460 MHz, thereby effectively reducing the interference range.

In another embodiment of the present disclosure, for avoidance of the interference, during the downlink scheduling, the downlink transmission resource may be scheduled within a frequency range of 3421 MHz to 3449 MHz and a frequency range of 3461 MHz to 3479 MHz, but the downlink transmission resource is allocated within the frequency range of 3450 MHz to 3460 MHz. In this way, the interference is prevented.

In the embodiment of the present disclosure, when the base station prevents the in-device interference by adjusting the uplink frequency-domain resource allocation, the uplink schedule frequency range for transmitting the uplink data may be narrowed, whereas the allocation manner of the PUCCH frequency-domain resource is not modified, such that the base station does not need to send uplink transmission configuration information to the UE. In this way, the signaling overhead is saved, and meanwhile the interference caused by the uplink data transmission to the downlink information transmission is reduced.

In the embodiment of the present disclosure, based on different forms of the frequency-domain resource schedulable by the base station, in the above embodiments, the target frequency range may also be narrowed in different ways.

In a first case, when the target frequency range includes component carriers in a predetermined quantity, the quantity of component carriers is reduced.

In a second case, when the target frequency range includes one component carrier, a bandwidth configuration of the component carrier is reduced.

For example, the component carrier of a fixed bandwidth includes the following bandwidth configurations: 20M, 15M, 10M and 5M. Assuming that the target frequency range pertains to the pre-configured 20M bandwidth in the component carrier, then during narrowing the target frequency range, the 20M bandwidth that is to be originally scheduled may be narrowed to a 10M bandwidth.

In a third case, when the target frequency range includes bandwidth parts in a predetermined quantity, the quantity of bandwidth parts is reduced.

In an NR system, the unit frequency-domain resource schedulable by the base station may be a BWP whose frequency range is adjustable. Therefore, the frequency range may be narrowed by reducing the quantity of BWPs.

In a fourth case, when the target frequency range includes bandwidth parts in a predetermined quantity, reducing a frequency range of at least one of the bandwidth parts.

Similar to adjustment of the CC bandwidth configuration, when the target frequency range is a BWP having a predefined bandwidth, since the frequency range of the BWP is adjustable, the frequency range of the BWP may be adjusted to a narrower range.

When the frequency-domain resource is presented in different forms of basic schedule units, the base station may adjust the target frequency range in different fashions, thereby enhancing flexibility of scheduling adjustment.

Referring back to FIG. 2, in step 14, the base station transmits information over a transmission resource after adjustment of the transmission resource configuration within the target frequency range, to avoid occurrence of the in-device interference.

In the embodiment of the present disclosure, when the base station schedules the transmission resource for a UE in the predefined scheduling manner, in-device interference may occur in the UE. In this case, the base station may adjust the frequency-domain resource configuration policy within the target frequency range, such that the UE transmits the uplink information over the frequency-domain resource within the uplink operating frequency range. In this way, the interference may be reduced or prevented when the UE receives the downlink information over the frequency-domain resource within the downlink operating frequency range, and thus the transmission performance of the 5G network system is enhanced.

Figure 9:
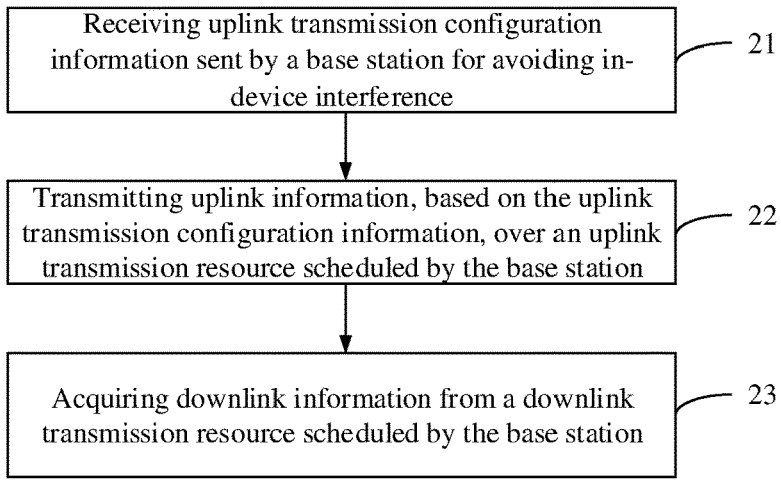
FIG. 9 is a flowchart of a method for transmitting information according to an exemplary embodiment.

Correspondingly, the present disclosure provides a method for transmitting information, which corresponds to the narrowing the uplink frequency range. FIG. 9 is a flowchart of a method for transmitting information according to an exemplary embodiment. As illustrated in FIG. 9, the method may include the following steps.

In step 21, uplink transmission configuration information sent by a base station for avoiding in-device interference is received, wherein the uplink transmission configuration information includes an adjustment parameter of an uplink frequency range.

Corresponding to step 133 (FIG. 7-2), the adjustment parameter of the uplink frequency range may be a start frequency point and an end frequency point of the adjusted uplink frequency range, or may be a serial number, bandwidth or the like information of the component carrier in the uplink scheduling.

In step 22, uplink information is transmitted, based on the uplink transmission configuration information, over an uplink transmission resource scheduled by the base station.

The uplink transmission configuration information is configured to notify the UE that the resource position of the PUCCH is changed, such that the UE periodically reports uplink control information over the frequency resources at two terminals of a new frequency range. The uplink control information at least includes: a downlink CQI indicative of downlink channel quality.

Meanwhile, the UE transmits uplink data over the uplink transmission resource within the uplink schedule frequency range scheduled by the base station.

In step 23, downlink information is acquired from a downlink transmission resource scheduled by the base station.

In the present disclosure, when the frequency range of the uplink frequency-domain resource allocated by the base station to the UE is narrowed relative to the uplink frequency range which the UE requests the base station to schedule, firstly the transmission configuration information sent by the base station for notifying the UE of the terminal frequency information is received, such that the UE determines the position of the PUCCH resource in the frequency-domain resource scheduled after the base station narrows the frequency range. This ensures that the UE periodically reports the downlink CQI, such that the base station performs the downlink scheduling based on measurement information reported by the UE.

Figure 10:
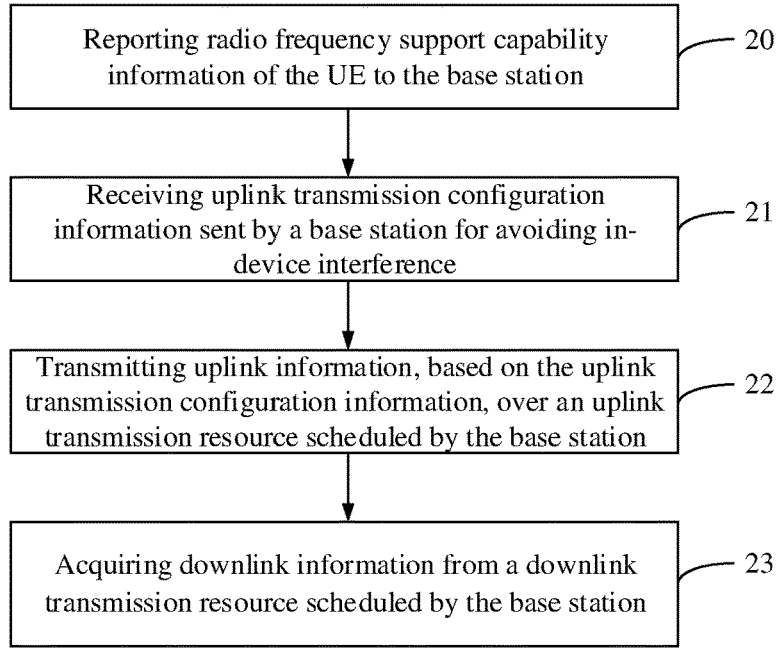
FIG. 10 is a flowchart of a method for transmitting information according to an exemplary embodiment.

FIG. 10 is a flowchart of a method for transmitting information according to an exemplary embodiment. As illustrated in FIG. 10, based on the embodiment illustrated in FIG. 9, the method may further include the following step:

In step 20, radio frequency support capability information of the UE is reported to the base station, such that the base station determines, based on the radio frequency support capability information, whether in-device interference is likely to occur.

This step corresponds to step 111 in FIG. 3. When the UE initially accesses the base station, the UE may report a radio frequency support capability thereof to the base station, such that the base station determines, based on the radio frequency capability of the UE, whether the in-device interference is likely to occur.

In another embodiment of the present disclosure, prior to step 21, the method may further include: sending an avoidance setting detection report to the base station, wherein the avoidance setting report is configured to notify the UE whether to trigger a predetermined operation when the in-device interference occurs to stop information transmission within at least one operating frequency range involved in the in-device interference.

This step corresponding to the step described above that the base station acquires the avoidance setting detection report to determine whether the UE is configured with the predefined interference avoidance settings.

In another embodiment of the present disclosure, prior to step 21, the method may further include: reporting adjustment capability information to the base station, such that the base station determines, based on the adjustment capability information, whether the UE supports an operating frequency range adjustment function.

This step corresponds to step 130 in FIG. 7-2. The UE reports the adjustment capability information thereof to the base station, such that the base station determines whether the UE supports the operating frequency range adjustment function, and hence determines whether to perform the subsequent steps.

With respect to the above described method embodiments, for illustrative purposes, the actions or steps are described as a series of action combinations. However, a person skilled in the art shall understand that the embodiments of the present disclosure are not subjected to limitations of the action sequences described above. Further, based on the embodiments of the present disclosure, some steps may be performed in another or other sequences or may be simultaneously performed.

In addition, a person skilled in the art should also know that the embodiments described herein are all exemplary embodiments, and all the involved actions and modules are not mandatory ones of the embodiments of the present disclosure.

Corresponding to the embodiments of the method for implementing the application functionality, the present disclosure further provides embodiments of an apparatus and terminal for implementing the application functionality.

Figure 11:
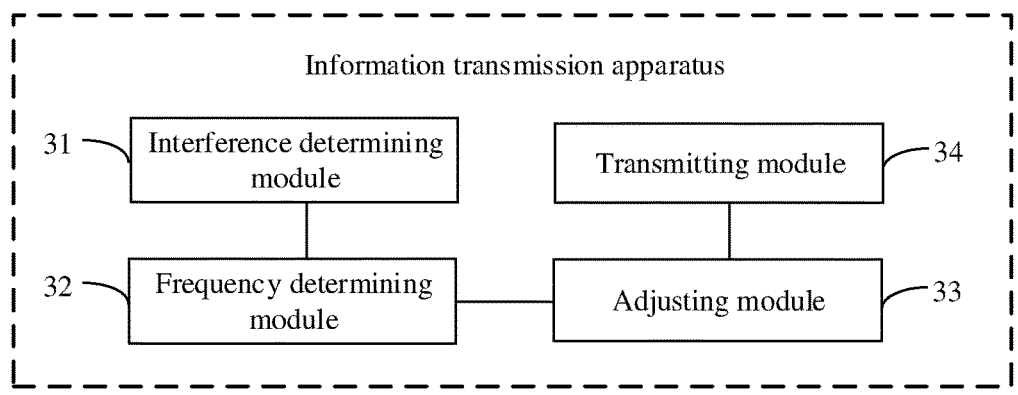
FIG. 11 is a block diagram of an apparatus for transmitting information according to an exemplary embodiment.

FIG. 11 is a block diagram of an apparatus for transmitting information according to an exemplary embodiment. As illustrated in FIG. 11, the apparatus is arranged in a base station, and the apparatus may include: an interference determining module 31, configured to determine whether in-device interference is likely to occur in a UE; a frequency determining module 32, configured to determine a target frequency range involved in the in-device interference when the in-device interference is likely to occur in the UE, the target frequency range including a target downlink frequency range and at least one target uplink frequency range; an adjusting module 33, configured to adjust a transmission resource configuration within the target frequency range; and a transmitting module 34, configured to transmit information over a transmission resource after adjustment of the transmission resource configuration within the target frequency range, to avoid occurrence of the in-device interference.

Figure 12:
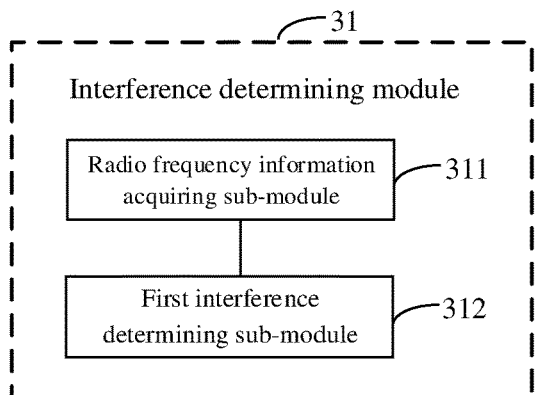
FIG. 12 is a block diagram of an apparatus for transmitting information according to an exemplary embodiment.

FIG. 12 is a block diagram of an apparatus for transmitting data according to an exemplary embodiment. As illustrated in FIG. 12, based on the apparatus embodiment illustrated in FIG. 11, the interference determining module 31 may include: a radio frequency information acquiring sub-module 311, configured to acquire radio frequency support capability information of the UE, the radio frequency support capability information at least including an uplink operating frequency range and a downlink operating frequency range; and a first interference determining sub-module 312, configured to determine, based on the uplink operating frequency range and the downlink operating frequency range, whether the in-device interference is likely to occur in the UE.

Figure 13:
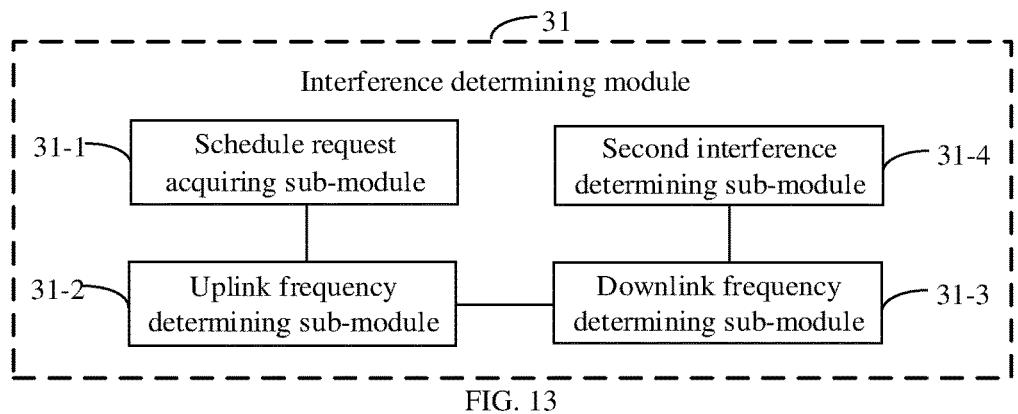
FIG. 13 is a block diagram of an apparatus for transmitting information according to an exemplary embodiment.

FIG. 13 is a block diagram of an apparatus for transmitting data according to an exemplary embodiment. As illustrated in FIG. 13, based on the apparatus embodiment illustrated in FIG. 11, the interference determining module 31 may include: a scheduling request acquiring sub-module 31-1, configured to acquire an uplink scheduling request sent by the UE; an uplink frequency determining sub-module 31-2, configured to determine a current uplink operating frequency range of the UE based on the uplink scheduling request; a downlink frequency determining sub-module 31-3, configured to determine downlink schedule information for the UE, the downlink schedule information at least including a downlink operating frequency range; and a second interference determining sub-module 31-4, configured to determine, based on the current uplink operating frequency range and the downlink operating frequency range, whether the in-device interference is likely to occur.

In another apparatus embodiment of the present disclosure, based on the embodiment as illustrated in FIG. 12 or FIG. 13, the interference determining module 31 may further includes: an avoidance setting determining sub-module, configured to determine that no predefined interference avoidance setting is configured in the UE, the interference avoidance setting being: when the in-device interference occurs, triggering a predefined operation such that information transmission is stopped within at least one target operating frequency range involved in the in-device interference.

Figure 14:
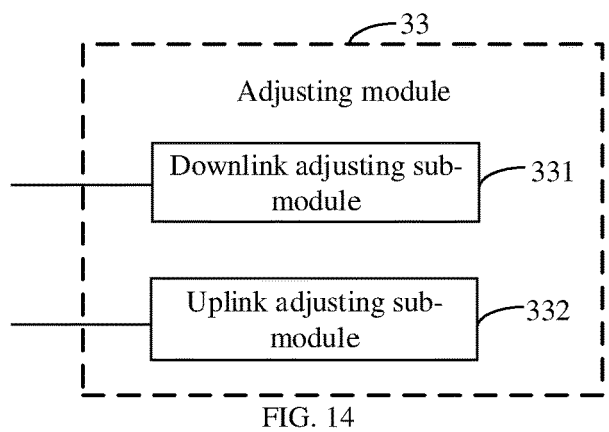
FIG. 14 is a block diagram of an apparatus for transmitting information according to an exemplary embodiment.

FIG. 14 is a block diagram of an apparatus for transmitting information according to an exemplary embodiment. As illustrated in FIG. 14, based on the apparatus embodiment illustrated in FIG. 11, the adjusting module 33 may include: a downlink adjusting sub-module 331, configured to adjust a downlink transmission resource configuration for the target downlink frequency range; and an uplink adjusting sub-module 332, configured to adjust an uplink transmission resource configuration for the target uplink frequency range.

Figure 15:
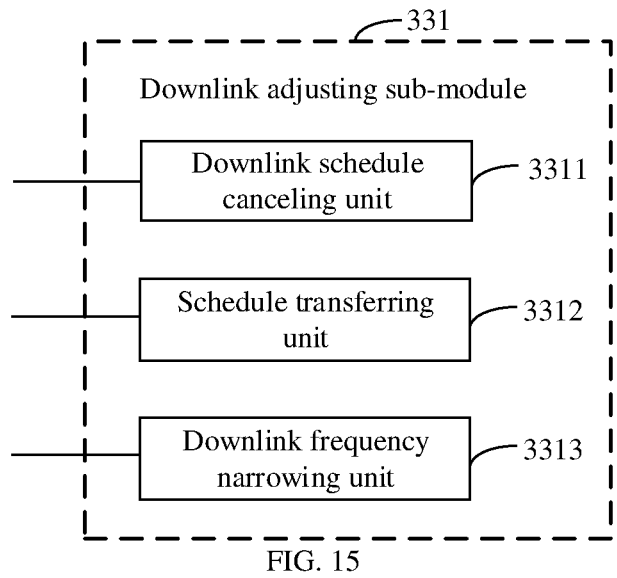
FIG. 15 is a block diagram of an apparatus for transmitting information according to an exemplary embodiment.

FIG. 15 is a block diagram of an apparatus for transmitting information according to an exemplary embodiment. As illustrated in FIG. 15, based on the apparatus embodiment illustrated in FIG. 14, the downlink adjusting sub-module 331 may include: a downlink schedule canceling unit 3311, configured to cancel the downlink transmission resource configuration currently within the current target downlink frequency range; a schedule transferring unit 3312, configured to configure a downlink transmission resource, planned to be configured for the target downlink frequency range, within an interference-free downlink frequency range; and a downlink frequency narrowing unit 3313, configured to narrow the target downlink frequency range, and configure the downlink transmission resource within a narrowed downlink frequency range.

In the above apparatus embodiments, the downlink transmission resource includes a downlink transmission resource for bearing a downlink transmission and/or a downlink retransmission.

In one embodiment of the present disclosure, the uplink adjusting sub-module 332 may be configured to, upon acquiring an uplink scheduling request, reject configuring an uplink transmission resource within the target uplink frequency range.

Figure 16:
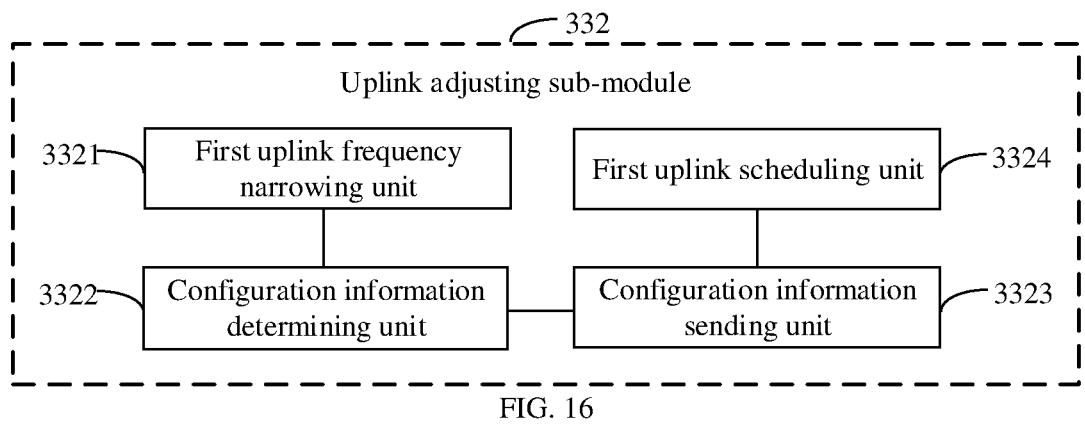
FIG. 16 is a block diagram of an apparatus for transmitting information according to an exemplary embodiment.

FIG. 16 is a block diagram of an apparatus for transmitting information according to an exemplary embodiment. As illustrated in FIG. 16, based on the apparatus embodiment illustrated in FIG. 14, the uplink adjusting sub-module 332 may include: a first uplink frequency narrowing unit 3321, configured to narrow the target uplink frequency range, and determine a new uplink frequency range; a configuration information determining unit 3322, configured to generate uplink transmission configuration information based on the new uplink frequency range, the uplink transmission configuration information including start frequency information and end frequency information of the new uplink frequency range; a configuration information sending unit 3323, configured to send the uplink transmission configuration information to the UE; and an uplink scheduling unit 3324, configured to configure the uplink transmission resource within the new uplink frequency range.

Figure 17:
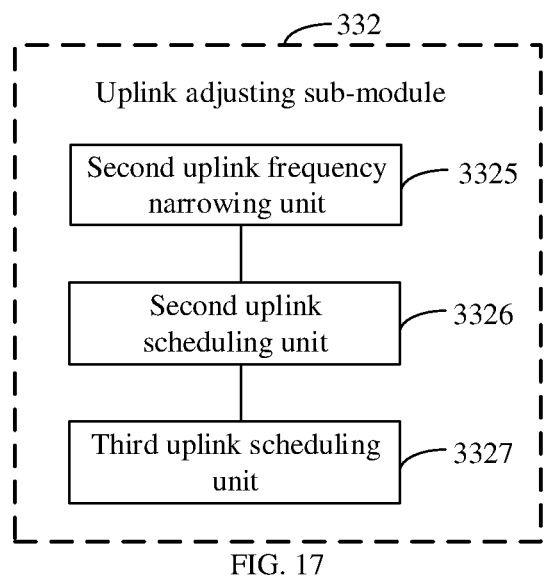
FIG. 17 is a block diagram of an apparatus for transmitting information according to an exemplary embodiment.

FIG. 17 is a block diagram of an apparatus for transmitting information according to an exemplary embodiment. As illustrated in FIG. 17, based on the apparatus embodiment illustrated in FIG. 14, the uplink adjusting sub-module 332 may include: a second uplink frequency narrowing unit 3325, configured to narrow, based on the target uplink frequency range, an uplink schedule frequency range for transmitting uplink data; a second uplink scheduling unit 3326, configured to configure, within the narrowed uplink schedule frequency range, an uplink transmission resource for transmitting the uplink data; and a third uplink scheduling unit 3327, configured to configure, within the target uplink frequency range, an uplink transmission resource for transmitting uplink control information on a designated frequency.

In the above apparatus embodiments, the uplink transmission resource includes an uplink transmission resource for bearing an uplink transmission and/or an uplink retransmission.

Figure 18:
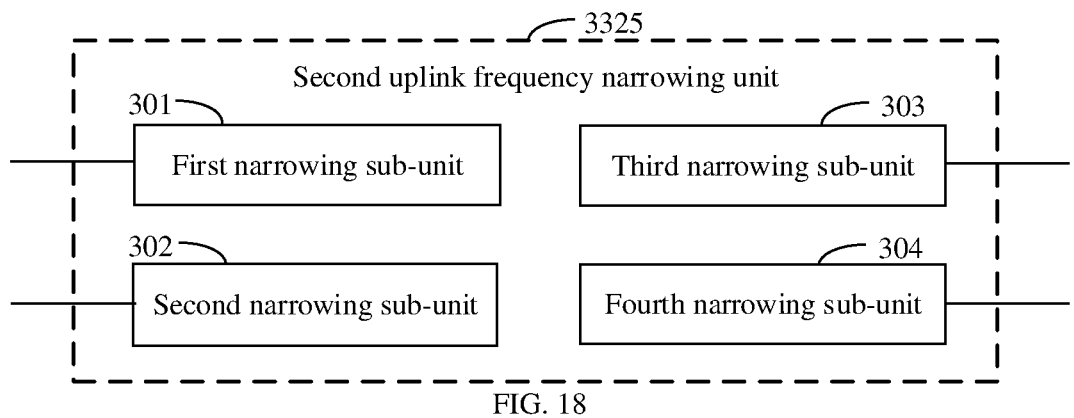
FIG. 18 is a block diagram of an apparatus for transmitting information according to an exemplary embodiment.

FIG. 18 is a block diagram of an apparatus for transmitting information according to an exemplary embodiment. As illustrated in FIG. 18, based on the apparatus embodiment illustrated in FIG. 17, the uplink information transmitting module 3325 may include any one of: a first narrowing sub-unit 301, configured to, when the target frequency range includes component carriers in a predetermined quantity, reduce the quantity of component carriers; a second narrowing sub-unit 302, configured to, when the target frequency range includes one component carrier, reduce a bandwidth configuration of the component carrier; a third narrowing sub-unit 303, configured to, when the target frequency range includes bandwidth parts in a predetermined quantity, reduce the quantity of bandwidth parts; or a fourth narrowing sub-unit 304, configured to, when the target frequency range includes bandwidth parts in a predetermined quantity, reduce a frequency range of at least one of the bandwidth parts.

The downlink frequency narrowing unit 3313 and the first uplink frequency narrowing unit 3321 may also include any one of the above sub-units.

Figure 19:
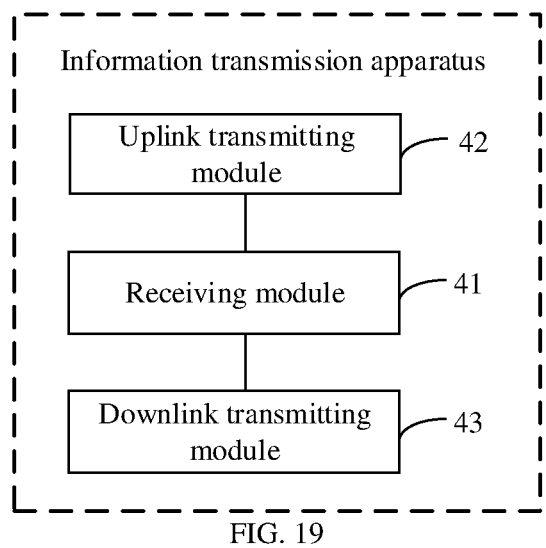
FIG. 19 is a block diagram of an apparatus for transmitting information according to an exemplary embodiment.

Corresponding to the method for transmitting information performed by the UE, the present disclosure further provides an apparatus for transmitting information that is arranged in the UE. FIG. 19 is a block diagram of an apparatus for transmitting information according to an exemplary embodiment. As illustrated in FIG. 19, the apparatus may include: a receiving module 41, configured to receive uplink transmission configuration information sent by a base station for avoiding in-device interference, the uplink transmission configuration information including an adjustment parameter of an uplink frequency range; an uplink transmitting module 42, configured to transmit, based on the uplink transmission configuration information, uplink information over an uplink transmission resource scheduled by the base station; and a downlink transmitting module 43, configured to acquire downlink information from a downlink transmission resource scheduled by the base station.

Figure 20:
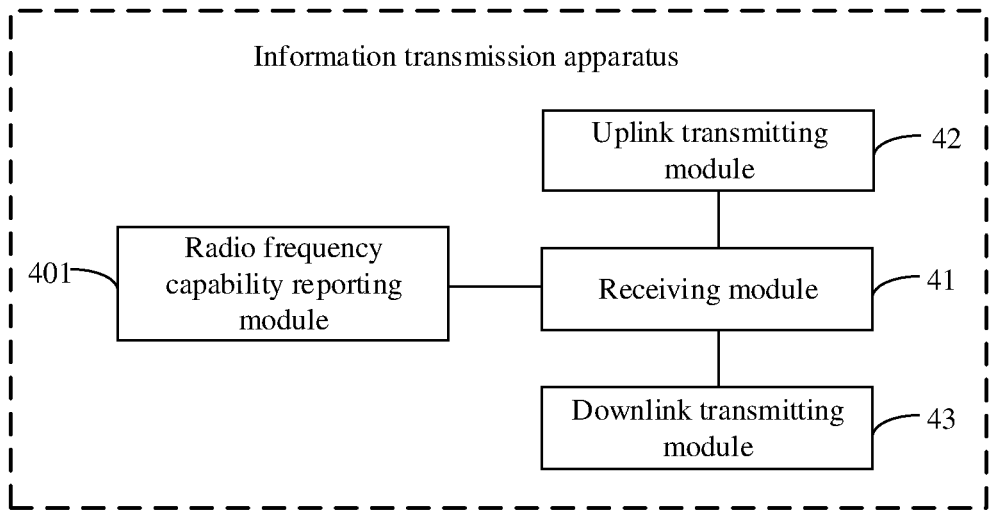
FIG. 20 is a block diagram of an apparatus for transmitting information according to an exemplary embodiment.

FIG. 20 is a block diagram of an apparatus for transmitting information according to an exemplary embodiment. As illustrated in FIG. 20, based on the apparatus embodiment illustrated in FIG. 19, the apparatus may further include: a radio frequency capability reporting module 401, configured to report radio frequency support capability information of the UE to the base station, such that the base station determines, based on the radio frequency support capability information, whether in-device interference is likely to occur.

Figure 21:
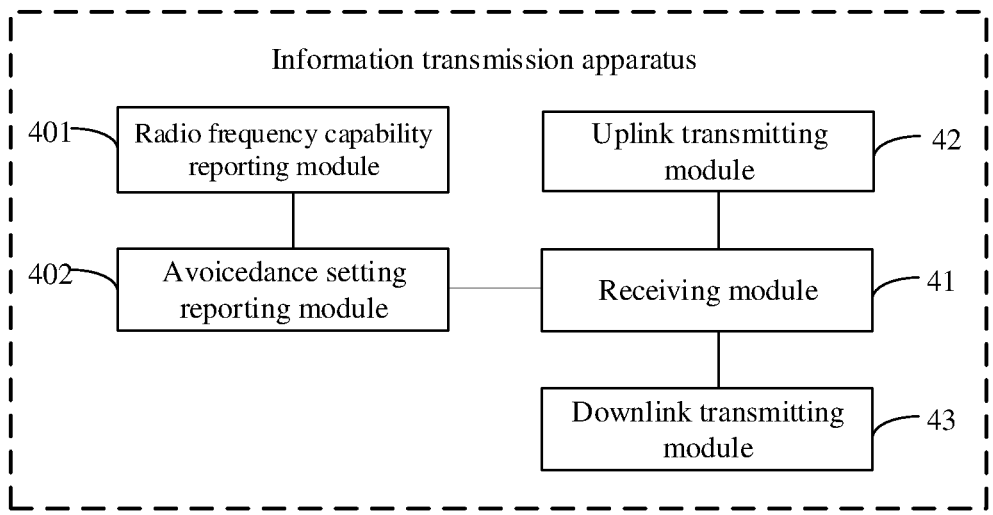
FIG. 21 is a block diagram of an apparatus for transmitting information according to an exemplary embodiment.

FIG. 21 is a block diagram of an apparatus for transmitting information according to an exemplary embodiment. As illustrated in FIG. 21, based on the apparatus embodiment illustrated in FIG. 20, the apparatus may further include: an avoidance setting reporting module 402, configured to send an avoidance setting detection report to the base station, wherein the avoidance setting report is configured to notify the UE whether to trigger a predetermined operation when the in-device interference occurs to stop information transmission within at least one operating frequency range involved in the in-device interference.

Figure 22:
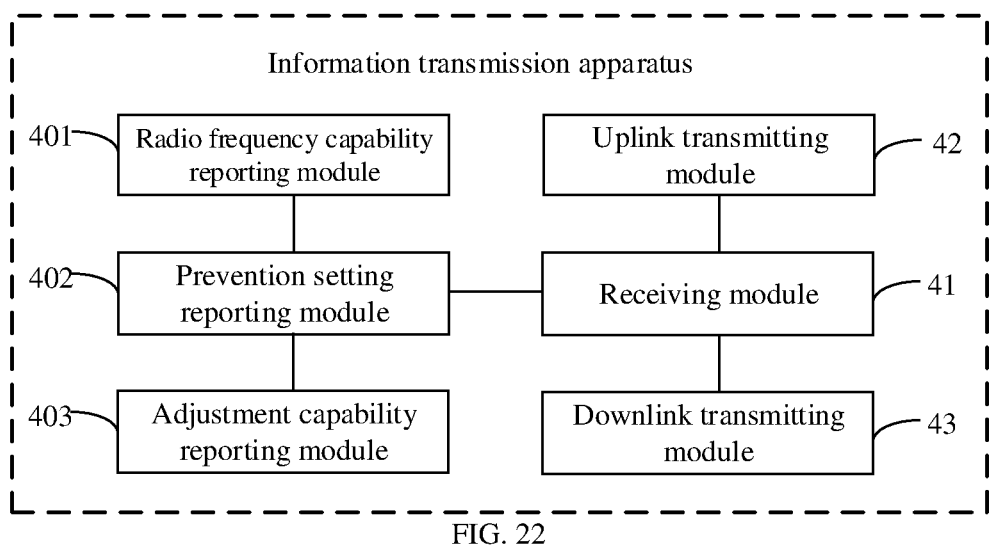
FIG. 22 is a block diagram of an apparatus for transmitting information according to an exemplary embodiment.

FIG. 22 is a block diagram of an apparatus for transmitting information according to an exemplary embodiment. As illustrated in FIG. 22, based on the apparatus embodiment illustrated in FIG. 21, the apparatus may further include: an adjustment capability reporting module 403, configured to report adjustment capability information to the base station, such that the base station determines, based on the adjustment capability information, whether the UE supports an uplink operating frequency adjustment function.

Since the apparatus embodiments substantially correspond to the method embodiments, reference may be made to the relevant part of the description in the method embodiments. The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all the modules may be selected according to the actual needs to achieve the objectives of the technical solutions according to the embodiments of the present disclosure. Persons of ordinary skill in the art may understand and implement the present disclosure without paying any creative effort.

In an exemplary embodiment, an apparatus for use in information transmission is provided. The apparatus includes: a processor; and a memory for storing instructions executable by the processor; wherein the processor is configured to: determine whether in-device interference is likely to occur in a UE; when the in-device interference is likely to occur, determine a target frequency range involved in the in-device interference, the target frequency range including a target downlink frequency range and at least one target uplink frequency range; adjust a transmission resource configuration within the target frequency range; and transmit information over a transmission resource after adjustment of the transmission resource configuration within the target frequency range, to avoid occurrence of the in-device interference.

In an exemplary embodiment, an apparatus for use in information transmission is provided. The apparatus includes: a processor; and a memory for storing instructions executable by the processor; wherein the processor is configured to: receive uplink transmission configuration information sent by a base station for avoiding in-device interference, the uplink transmission configuration information including an adjustment parameter of an uplink frequency range; transmit, based on the uplink transmission configuration information, uplink information over an uplink transmission resource scheduled by the base station; and acquire downlink information from a downlink transmission resource scheduled by the base station.

Figure 23:
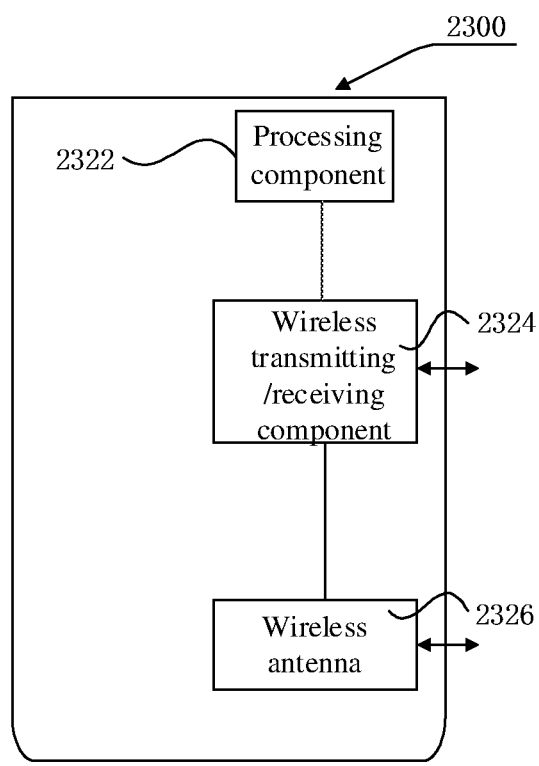
FIG. 23 is a schematic diagram of an apparatus for use in information transmission according to an exemplary embodiment.

FIG. 23 is a schematic diagram of an apparatus 2300 for use in information transmission according to an exemplary embodiment. The apparatus 2300 may be provided as a base station. Referring to FIG. 23, the apparatus 2300 includes a processing component 2322, a wireless transmitting/receiving component 2324, a wireless antenna 2326, and a signal processing part dedicated for a wireless interface. The processing component 2322 may further include one or a plurality of processors.

One processor in the processing component 2322 may be configured to: determine whether in-device interference is likely to occur in a UE; when the in-device interference is likely to occur, determine a target frequency range involved in the in-device interference, the target frequency range including a target downlink frequency range and at least one target uplink frequency range; adjust a transmission resource configuration within the target frequency range; and transmit information over a transmission resource after adjustment of the transmission resource configuration within the target frequency range, to avoid occurrence of the in-device interference.

In an exemplary embodiment, a non-transitory computer-readable storage medium including instructions may be further provided. The non-transitory computer-readable storage medium stores computer instructions, which may be executed by the processing component 2322 in the apparatus 2300 to perform the method for transmitting information as illustrated in any of FIG. 2 to FIG. 8. For example, the non-transitory computer-readable storage medium may be a read-only memory (ROM), a random access memory (RAM), a compact disc ROM (CD-ROM), a magnetic tape, a floppy disk, an optical data storage device or the like.

Figure 24:
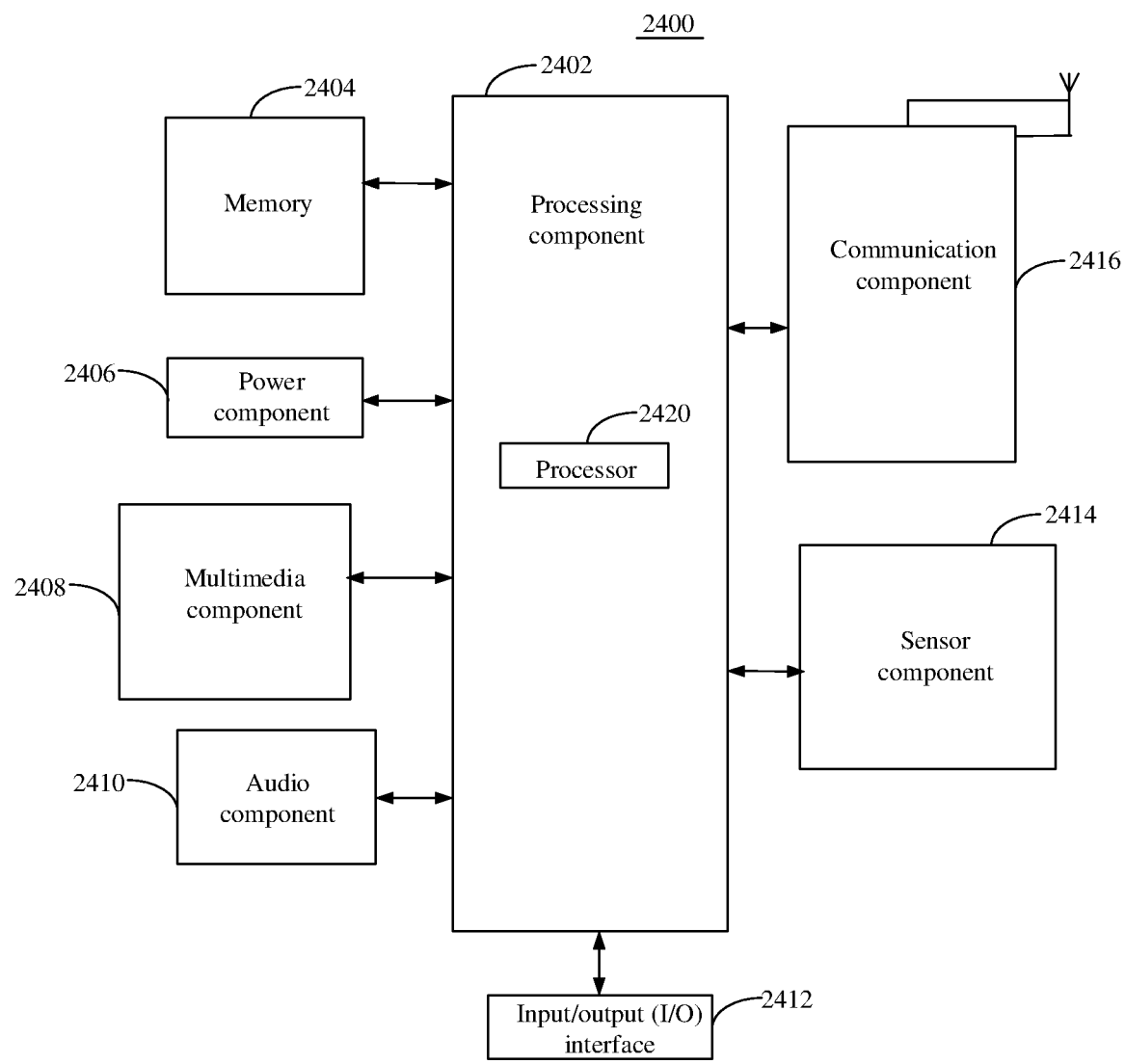
FIG. 24 is a schematic diagram of an apparatus for use in information transmission according to an exemplary embodiment.

FIG. 24 is a block diagram of an information transmission apparatus 2400 in accordance with an exemplary embodiment. For example, the information transmission apparatus 2400 may be user equipment, such as a mobile phone, a computer, a digital broadcast terminal, a messaging device, a gaming console, a tablet device, a medical device, a fitness equipment, a personal digital assistant, and the like.

Referring to FIG. 24, the information transmission apparatus 2400 may include one or more of the following components: a processing component 2402, a memory 2404, a power component 2406, a multimedia component 2408, an audio component 2410, an input/output (I/O) interface 2412, a sensor component 2414, and a communication component 2416.

The processing component 2402 typically controls the overall operations of the information transmission apparatus 2400, such as the operations associated with display, telephone calls, data communications, camera operations, and recording operations. The processing component 2402 may include one or more processors 2420 to execute instructions to perform all or part of the steps in the above described methods. Moreover, the processing component 2402 may include one or more modules which facilitate the interaction between the processing component 2402 and other components. For instance, the processing component 2402 may include a multimedia module to facilitate the interaction between the multimedia component 2408 and the processing component 2402.

The memory 2404 is configured to store various types of data to support the operation of the information transmission apparatus 2400. Examples of such data include instructions for any applications or methods operated on the information transmission apparatus 2400, contact data, phonebook data, messages, pictures, videos, etc. The memory 2404 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2406 provides power to various components of the information transmission apparatus 2400. The power component 2406 may include a power management system, one or more power sources, and any other components associated with the generation, management, and distribution of power in the information transmission apparatus 2400.

The multimedia component 2408 includes a screen providing an output interface between the information transmission apparatus 2400 and the user. In some embodiments, the screen may include a liquid crystal display (LCD) and a touch panel (TP). When the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 2408 includes a front camera and/or a rear camera. The front camera and the rear camera may receive external multimedia data while the information transmission apparatus 2400 is in an operation mode, such as a photographing mode or a video mode. Each of the front camera and the rear camera may be a fixed optical lens system or have focus and optical zoom capability.

The audio component 2410 is configured to output and/or input audio signals. For example, the audio component 2410 includes a microphone (MIC) configured to receive external audio signals when the information transmission apparatus 2400 is in an operation mode, such as a call mode, a recording mode, and a voice recognition mode. The received audio signal may be further stored in the memory 2404 or transmitted via the communication component 2416. In some embodiments, the audio component 2410 further includes a speaker for outputting audio signals.

The I/O interface 2412 provides an interface between the processing component 2402 and peripheral interface modules, such as a keyboard, a click wheel, buttons, and the like. The buttons may include, but are not limited to, a home button, a volume button, a start button, and a lock button.

The sensor component 2414 includes one or more sensors to provide status assessments of various aspects of the information transmission apparatus 2400. For instance, the sensor component 2414 may detect an on/off status of the information transmission apparatus 2400, relative positioning of components, e.g., the display device and the mini keyboard of the information transmission apparatus 2400, and the sensor component 2414 may also detect a position change of the information transmission apparatus 2400 or a component of the information transmission apparatus 2400, presence or absence of user contact with the information transmission apparatus 2400, orientation or acceleration/deceleration of the information transmission apparatus 2400, and temperature change of the information transmission apparatus 2400. The sensor component 2414 may include a proximity sensor configured to detect the presence of nearby objects without any physical contact. The sensor component 2414 may also include a light sensor, such as a CMOS or CCD image sensor, used for imaging applications. In some embodiments, the sensor component 2414 may also include an accelerometer sensor, a gyroscope sensor, a magnetic sensor, a pressure sensor, or a temperature sensor.

The communication component 2416 is configured to facilitate communication, wired or wirelessly, between the information transmission apparatus 2400 and other devices. The information transmission apparatus 2400 can access a wireless network based on a communication standard, such as WiFi, 4G, or 5G, or a combination thereof. In an exemplary embodiment, the communication component 2416 receives broadcast signals or broadcast associated information from an external broadcast management system via a broadcast channel. In an exemplary embodiment, the communication component 2416 further includes a near field communication (NFC) module to facilitate short-range communications.

In exemplary embodiments, the information transmission apparatus 2400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 2404 including instructions, executable by the processor 2420 in the information transmission apparatus 2400, for performing the above-described methods. For example, the non-transitory computer-readable storage medium may be a ROM, a RAM, a CD-ROM, a magnetic tape, a floppy disc, an optical data storage device, and the like.

The technical solutions according to the embodiments of the present disclosure may achieve the following beneficial effects.

In the embodiments of the present disclosure, when the base station schedules the transmission resource for the UE based on a predefined scheduling manner, in-device interference may be caused in the UE. In this case, the base station may adjust a frequency-domain resource configuration policy within the target frequency range, such that the in-device interference is prevented when the UE transmits information over a transmission resource scheduled by the base station, and thus transmission performance of the 5G network system is improved.

In the present disclosure, the base station may determine in advance, based on acquired radio frequency support capability of the UE, that is, an uplink operating frequency range and an downlink operating frequency range of the UE, whether the in-device interference may occur during simultaneous uplink and downlink transmissions by the UE. In this way, preparations may be made in advance for adjust a scheduling policy, and a schedule policy for preventing occurrence of the in-device interference may be formulated in advance.

In the present disclosure, the base station may determine in real time, based on an uplink scheduling request of the UE, whether the in-device interference is likely to occur, such that a resource schedule policy may be adjusted at a previous moment before occurrence of the interference. In this way, occurrence of the in-device interference is prevented in real time, and the efficiency of information transmission is improved.

In the present disclosure, prior to performing resource scheduling for preventing the in-device interference, the base station may further firstly determine whether settings for preventing the in-device interference are configured in the UE, and effectively prevent occurrence of the in-device interface by modifying a frequency-domain resource schedule policy. In this way, a scenario where scheduling adjustment by the base station fails due to the interference avoidance capability of the UE is prevented.

In the present disclosure, based on priorities of uplink and downlink services to be transmitted, the base station may prevent occurrence of the in-device interference by adjusting a downlink transmission resource allocation and/or an uplink transmission resource allocation. In this way, occurrence of the in-device interference is reasonably prevented by adjusting different frequency-domain resources.

In the present disclosure, when the base station adjust a downlink frequency-domain resource allocation, occurrence of the in-device interference may be effectively prevented by canceling, transferring or narrowing a downlink transmission resource configuration within the target downlink frequency range.

In the present disclosure, when the base station prevents the in-device interference by adjusting an uplink frequency-domain resource allocation, the base station may prevent the interference by canceling uplink frequency-domain resource scheduling, to ensure effective transmission of the downlink information.

In the present disclosure, when the base station prevents the in-device interference by adjusting an uplink frequency-domain resource allocation, the base station may narrow the target uplink frequency range, and allocate frequency-domain information within a smaller frequency range, to reduce the interference caused to the downlink transmission. In this way, since modification of the UE via the PUCCH resource, related information of the narrowed frequency range needs to be sent to the UE, such that the UE transmits the uplink control information at a correct frequency point, to ensure correct transmission of the uplink and downlink information.

In the present disclosure, when the base station prevents the in-device interference by adjusting the uplink frequency-domain resource allocation, only the uplink schedule frequency range for transmitting the uplink data may be narrowed, whereas the allocation fashion of the PUCCH frequency-domain resource is not modified, such that the base station does not need to send uplink transmission configuration information to the UE. In this way, the signaling overhead is saved, and meanwhile the interference caused by the uplink data transmission to the downlink information transmission is reduced.

In the present disclosure, the scheduling-adjusted frequency range not only involves a newly scheduled frequency range, but also includes a frequency range for information retransmission. In this way, uninterrupted retransmissions due to failures of retransmissions due to the in-device interference when the information to be retransmitted within the target frequency range is retransmitted may be prevented, and wireless transmission resources of the system may be saved.

In the present disclosure, when the frequency-domain resource is presented in different forms of basic schedule units, the base station may adjust the target frequency range in different fashions, thereby enhancing flexibility of scheduling adjustment.

Other embodiments of the present disclosure will be apparent to those skilled in the art upon consideration of the specification and practice of disclosed herein. The present disclosure is intended to cover any variations, uses, or adaptations of the present disclosure following general principles of the present disclosure and including the common general knowledge or conventional technical means in the art without departing from the present disclosure. The specification and examples may be shown as illustrative only, and the true scope and spirit of the disclosure are indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for transmitting information, applied to a base station, the method comprising:
   determining a target frequency range involved in an in-device interference in user equipment when the in-device interference is to occur, wherein the target frequency range comprises a target downlink frequency range and at least one target uplink frequency range;
   adjusting a transmission resource configuration within the target frequency range; and
   transmitting information using a transmission resource after adjustment of the transmission resource configuration within the target frequency range, to avoid occurrence of the in-device interference.

2. The method according to claim 1, prior to determining the target frequency range, further comprising:
   determining whether the in-device interference is to occur in the user equipment.

3. The method according to claim 2, wherein the determining whether the in-device interference is occur in the user equipment comprises:

acquiring radio frequency support capability information of the user equipment, wherein the radio frequency support capability information at least comprises an uplink operating frequency range and a downlink operating frequency range; and determining, based on the uplink operating frequency range and the downlink operating frequency range, whether the in-device interference is to occur in the user equipment.

4. The method according to claim 2, wherein the determining whether the in-device interference is to occur in the user equipment comprises:

acquiring an uplink scheduling request sent by the user equipment;

determining a current uplink operating frequency range of the user equipment based on the uplink scheduling request;

determining downlink schedule information for the user equipment, wherein the downlink schedule information at least comprises a downlink operating frequency range; and determining, based on the current uplink operating frequency range and the downlink operating frequency range, whether the in-device interference is to occur.

5. The method according to claim 2, wherein the determining whether the in-device interference is to occur in the user equipment comprises:

determining that no predefined interference avoidance setting is configured in the user equipment, the interference avoidance setting being: when the in-device interference occurs, triggering a predefined operation to stop information transmission within at least one target operating frequency range involved in the in-device interference.

6. The method according to claim 1, wherein the adjusting a transmission resource configuration within the target frequency range comprises at least one of:

adjusting a downlink transmission resource configuration for the target downlink frequency range; and adjusting an uplink transmission resource configuration for the target uplink frequency range.

7. The method according to claim 6, wherein the adjusting a downlink transmission resource configuration within the target downlink frequency range comprises at least one of:

canceling the downlink transmission resource configuration currently within the target downlink frequency range;

configuring a downlink transmission resource, originally configured for the target downlink frequency range, within an interference-free downlink frequency range; and narrowing the target downlink frequency range, and configuring the downlink transmission resource within a narrowed downlink frequency range.

8. The method according to claim 6, wherein the adjusting an uplink transmission resource configuration for the target uplink frequency range comprises:

upon acquiring an uplink scheduling request, rejecting configuring an uplink transmission resource within the target uplink frequency range.

9. The method according to claim 6, wherein the adjusting an uplink transmission resource configuration for the target uplink frequency range comprises:

narrowing the target uplink frequency range, and determining a new uplink frequency range;

generating uplink transmission configuration information based on the new uplink frequency range, wherein the uplink transmission configuration information comprises start frequency information and end frequency information of the new uplink frequency range;

sending the uplink transmission configuration information to the user equipment; and configuring the uplink transmission resource within the new uplink frequency range.

10. The method according to claim 6, wherein the adjusting an uplink transmission resource configuration for the target uplink frequency range comprises:

narrowing, based on the target uplink frequency range, an uplink schedule frequency range for transmitting uplink data;

configuring, within the narrowed uplink schedule frequency range, an uplink transmission resource for transmitting the uplink data; and configuring, within the target uplink frequency range, an uplink transmission resource for transmitting uplink control information on a designated frequency.

11. The method according to claim 6, wherein the adjusting an uplink or downlink transmission resource configuration comprises at least one of:

when the target frequency range comprises component carriers in a predetermined quantity, reducing the quantity of component carriers;

when the target frequency range comprises one component carrier, reducing a bandwidth configuration of the component carrier;

when the target frequency range comprises bandwidth parts in a predetermined quantity, reducing the quantity of bandwidth parts; or when the target frequency range comprises bandwidth parts in a predetermined quantity, reducing a frequency range of at least one of the bandwidth parts.

12. A method for transmitting information, applied to user equipment, the method comprising:

receiving uplink transmission configuration information sent by a base station for avoiding in-device interference, wherein the uplink transmission configuration information comprises an adjustment parameter of an uplink frequency range;

transmitting, based on the uplink transmission configuration information, uplink information using an uplink transmission resource scheduled by the base station; and acquiring downlink information from a downlink transmission resource scheduled by the base station.

13. The method according to claim 12, further comprising:

reporting radio frequency support capability information of the user equipment to the base station, to cause the base station to determine, based on the radio frequency support capability information, whether in-device interference is to occur.

14. An apparatus for transmitting information, applied to a base station, the apparatus comprising:

a processor; and a memory storing instructions executable by the processor;

wherein the processor is configured to:

determine a target frequency range involved in an in-device interference in user equipment when the in-device interference is to occur in the user equipment, wherein the target frequency range comprises a target downlink frequency range and at least one target uplink frequency range;

adjust a transmission resource configuration within the target frequency range; and transmit information using a transmission resource after adjustment of the transmission resource configuration within the target frequency range, to avoid occurrence of the in-device interference.

15. The apparatus according to claim 14, wherein prior to determining the target frequency range, the processor is further configured to:

determine whether the in-device interference is to occur in the user equipment.

16. The apparatus according to claim 15, wherein the processor is further configured to:

acquire radio frequency support capability information of the user equipment, wherein the radio frequency support capability information at least comprises an uplink operating frequency range and a downlink operating frequency range; and determine, based on the uplink operating frequency range and the downlink operating frequency range, whether the in-device interference is to occur in the user equipment.

17. The apparatus according to claim 15, wherein the processor is further configured to:

acquire an uplink scheduling request sent by the user equipment;

determine a current uplink operating frequency range of the user equipment based on the uplink scheduling request;

determine downlink schedule information for the user equipment, wherein the downlink schedule information at least comprises a downlink operating frequency range; and determine, based on the current uplink operating frequency range and the downlink operating frequency range, whether the in-device interference is to occur.

18. The apparatus according to claim 15, wherein the processor is further configured to:

determine that no predefined interference avoidance setting is configured in the user equipment, the interference avoidance setting being: when the in-device interference occurs, triggering a predefined operation to stop information transmission within at least one target operating frequency range involved in the in-device interference.

19. The apparatus according to claim 14, wherein the processor is further configured to perform at least one of:

adjusting a downlink transmission resource configuration for the target downlink frequency range; and adjusting an uplink transmission resource configuration for the target uplink frequency range.

20. The apparatus according to claim 19, wherein the processor is further configured to perform at least one of:

cancelling the downlink transmission resource configuration currently within the target downlink frequency range;

configuring a downlink transmission resource originally configured for the target downlink frequency range, within an interference-free downlink frequency range; and narrowing the target downlink frequency range, and configure the downlink transmission resource within a narrowed downlink frequency range.

21. The apparatus according to claim 19, wherein the processor is further configured to, upon acquiring an uplink scheduling request, reject configuring an uplink transmission resource within the target uplink frequency range.

22. The apparatus according to claim 19, wherein the processor is further configured to:

narrow the target uplink frequency range, and determine a new uplink frequency range;

generate uplink transmission configuration information based on the new uplink frequency range, wherein the uplink transmission configuration information comprises start frequency information and end frequency information of the new uplink frequency range;

send the uplink transmission configuration information to the user equipment; and configure the uplink transmission resource within the new uplink frequency range.

23. The apparatus according to claim 19, wherein the processor is further configured to:

narrow, based on the target uplink frequency range, an uplink schedule frequency range for transmitting uplink data; configure, within the narrowed uplink schedule frequency range, an uplink transmission resource for transmitting the uplink data; and configure, within the target uplink frequency range, an uplink transmission resource for transmitting uplink control information on a designated frequency.

24. The apparatus according to claim 19, wherein the processor is further configured to perform at least one of:

when the target frequency range comprises component carriers in a predetermined quantity, reduce the quantity of component carriers;

when the target frequency range comprises one component carrier, reduce a bandwidth configuration of the component carrier;

when the target frequency range comprises bandwidth parts in a predetermined quantity, reduce the quantity of bandwidth parts; or when the target frequency range comprises bandwidth parts in a predetermined quantity, reduce a frequency range of at least one of the bandwidth parts.

25. An apparatus for transmitting information, applied to user equipment, the apparatus comprising:

a processor; and a memory storing instructions executable by the processor;

wherein the processor is configured to perform the method of claim 12.

* * * * *